United States Patent [19]

Kojima et al.

[11] Patent Number: 5,037,726

[45] Date of Patent: Aug. 6, 1991

[54] METHOD FOR FORMING A DIRECT POSITIVE IMAGE FROM A MATERIAL COMPRISING A NUCLEATION ACCELERATOR

[75] Inventors: Tetsuro Kojima; Noriyuki Inoue, both of Kanagawa, Japan

[73] Assignee: Fuji Photo Film Co., Ltd., Kanagawa, Japan

[21] Appl. No.: 280,904

[22] Filed: Dec. 7, 1988

[30] Foreign Application Priority Data

Dec. 8, 1987 [JP] Japan ................................ 62-310029

Dec. 10, 1987 [JP] Japan ................................ 62-312872

[51] Int. Cl.$^5$ .......................... C03C 5/50; C03C 7/30; C03C 1/495

[52] U.S. Cl. .................................... 430/378; 430/405; 430/406; 430/409; 430/410; 430/440; 430/445; 430/446; 430/448; 430/485; 430/566; 430/598; 430/600; 430/611; 430/613; 430/940

[58] Field of Search ............... 430/378, 406, 405, 409, 430/410, 440, 445, 446, 448, 483, 566, 598, 600, 661, 613, 940

[56] References Cited

U.S. PATENT DOCUMENTS

| | | | |
|---|---|---|---|
| 4,351,896 | 9/1982 | Atland et al. | 430/566 |
| 4,378,424 | 3/1983 | Atland et al. | 430/566 |
| 4,409,390 | 9/1983 | Atland et al. | 430/566 |
| 4,459,351 | 7/1984 | Adin et al. | 430/445 |
| 4,471,044 | 9/1984 | Parton et al. | 430/598 |
| 4,481,285 | 11/1984 | Takagi et al. | 430/410 |
| 4,581,330 | 4/1986 | Gunther et al. | 430/611 |
| 4,582,775 | 4/1986 | Toriuchi et al. | 430/611 |
| 4,624,913 | 11/1986 | Miyasaka et al. | 430/611 |
| 4,631,253 | 12/1986 | Mifune et al. | 430/567 |
| 4,675,276 | 6/1987 | Nakamura et al. | 430/446 |
| 4,789,627 | 12/1988 | Inoue et al. | 430/406 |
| 4,801,520 | 1/1989 | Inoue et al. | 430/378 |
| 4,863,839 | 9/1989 | Heki et al. | 430/378 |
| 4,871,653 | 10/1989 | Inoue et al. | 430/409 |
| 4,880,729 | 11/1989 | Heki et al. | 430/410 |
| 4,933,265 | 6/1990 | Inoue et al. | 430/378 |

FOREIGN PATENT DOCUMENTS

| | | | |
|---|---|---|---|
| 249239 | 12/1987 | European Pat. Off. | 430/410 |
| 3721570 | 1/1988 | Fed. Rep. of Germany | 430/378 |
| 226652 | 9/1988 | Japan | 430/378 |
| 239438 | 10/1988 | Japan | 430/410 |

OTHER PUBLICATIONS

Research Disclosure 18246, "Direct Position . . . ", 6/79, pp. 342-343.

U.S. Application Serial #07/060790, Inoue et al, "Silver Halide . . . , "6/12/87.

*Primary Examiner*—Charles L. Bowers, Jr.

*Assistant Examiner*—Patrick A. Doody

*Attorney, Agent, or Firm*—Sughrue, Mion, Zinn, Macpeak & Seas

[57] ABSTRACT

A method for forming a direct positive image having a high Dmax and a low Dmin, which comprises imagewise exposing a photographic light-sensitive material having on a support at least one photographic emulsion layer containing unprefogged internal latent image-type silver halide grains and developing the photographic light-sensitive material after or while fogging to form direct positive image, wherein the aforesaid development is performed in the existence of at least one compound selected from the group consisting of compounds represented by formula (I), (II), (III), (IV), (V) or (VI), acid salts of compounds represented by formula (I) to (IV) provided substituents thereof contain an amino group, and acid salts of compound represented by formula (V) or (VI);

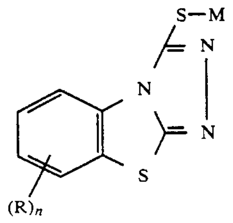

(I)

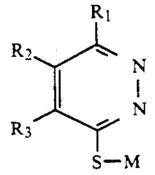

(II)

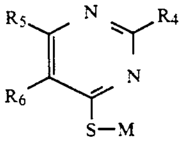

(III)

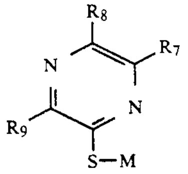

(IV)

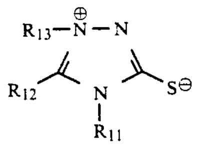

(V)

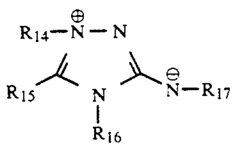

(VI)

wherein symbols are defined as in claim 1.

17 Claims, No Drawings

METHOD FOR FORMING A DIRECT POSITIVE IMAGE FROM A MATERIAL COMPRISING A NUCLEATION ACCELERATOR

FIELD OF THE INVENTION

The present invention relates to a method for forming a photographic image, and more particularly, to a method for forming a direct positive image.

BACKGROUND OF THE INVENTION

Methods of forming a direct positive image, which involve using unprefogged internal latent-image type silver halide photographic emulsions, and subjecting them to surface development subsequent to or simultaneous with a fogging process performed after imagewise exposure, are well known.

The term "internal latent-image type silver halide photographic emulsions" as used above refers to silver halide photographic emulsions of the type which have light-sensitive nuclei mainly inside the silver halide grains, and form a latent image predominantly inside the grains by exposure.

Various methods are known in this field, and the principal ones are described, e.g., in U.S. Pat. Nos. 2,592,250, 2,466,957, 2,497,875, 2,588,982, 3,317,322, 3,761,266, 3,761,276 and 3,796,577, British Patents 1,151,363, 1,150,533 and 1,011,062.

These known methods can generally provide photographic light-sensitive materials having a comparatively high photographic speed, considering that they are direct positive type.

Details of the mechanisms of the direct-positive image formation are described, e.g., in T.H. James, *The Theory of the Photographic Process,* (4th ed.), chap. 7, pp. 182–193, and U.S. Pat. No. 3,761,276.

Specifically, it is believed that the surface desensitization attributable to the internal latent image produced inside silver halide grains by the first imagewise exposure brings about selective formation of fogged nuclei at only the individual surfaces of silver halide grains present in unexposed areas, and a conventional surface-development processing subsequent to the imagewise exposure produces a photographic image (direct-positive image) in the unexposed areas.

As the means of selectively forming fogged nuclei, as described above, there are known a method of giving a second exposure to the whole surface of a light-sensitive layer, which is generally called "an optical fogging method" (as described, e.g., in British Patent 1,151,363), and a method using a nucleating agent, which is called "a chemical fogging method". Details of the latter method are described, e.g., in *Research Disclosure,* vol. 151, No. 15162, pp. 76–78 (Nov., 1976).

Formation of direct-positive (color) images can be achieved by subjecting silver halide photographic materials of the internal latent-image type to a surface color development-processing after or as they undergo a fogging treatment, and then (to a bleach processing and) a fixation processing successively (or a bleach-fix processing). After (bleach and) fixation processings, washing and/or stabilization is performed. (In parentheses processes for obtaining color images are shown.)

As for the nucleating agent used in the foregoing "chemical fogging method", hydrazine compounds are well known.

The nucleating agents of hydrazine type, though superior in discrimination because they generally cause a great difference between the maximum density and the minimum density, have the disadvantage that they require a high pH condition (pH 12) in the development-processing.

As for the nucleating agents which can function under a lower pH processing condition (pH≦12), heterocyclic quaternary ammonium salts are known, and described, e.g., in U.S. Pat. Nos. 3,615,615, 3,719,494, 3,734,738, 3,759,901, 3,854,956, 4,094,683 and 4,306,016, British Patent 1,283,835, JP-A-52-3426 and JP-A-52-69613 (The term "JP-A" as used herein means an "unexamined published Japanese patent application"). In particular, propargylor butinyl-substituted heterocyclic quaternary ammonium salts disclosed in U.S. Pat. No. 4,115,122 are excellent nucleating agents in respect of discrimination in direct positive silver halide emulsions. However, they are unsatisfactory because, e.g., when sensitizing dyes are added to the foregoing silver halide emulsions for the purpose of spectral sensitization, competitive adsorption to silver halide emulsion grains occurs between the sensitizing dyes and the nucleating agents of heterocyclic quaternary ammonium salts. This requires the addition of a large quantity of quaternary salt type nucleating agent because of its weak adsorptivity, to cause uneven density and loss of color balance, particularly in the case of multilayer color photographic materials. Undesirable influences of this phenomenon tend to become more serious under running processing or upon storage under high temperature and high humidity conditions.

With the intention of solving the foregoing problem, U.S. Pat. No. 4,471,044 discloses a quaternary salt type nucleating agent which contains a thioamide group as a group for accelerating the adsorption to silver halide grains. Though introduction of the adsorption accelerating group can reduce the addition amount of the nucleating agent required for achievement of sufficiently high Dmax and reduces the a decrease in Dmax upon storage under high temperatures, the effect is not yet satisfactory.

SUMMARY OF THE INVENTION

An object of the present invention is to provide a method for forming a direct positive image having a high maximum image density (Dmax) and a low minimum image density (Dmin).

The aforesaid objects of this invention can be attained by a direct positive image forming process by imagewise exposing a photographic light-sensitive material having on a support at least one photographic emulsion layer containing unprefogged internal latent image-type silver halide grains and developing the photographic light-sensitive material after or while fogging to form direct positive image, wherein the aforesaid development is performed in the existence of at least one compound selected from the group consisting of compounds represented by formula (I), (II), (III), (IV), (V) or (VI), acid salts of compounds represented by formula (I) to (IV) provided substituents thereof contain an amino group, and acid salts of compounds represented by formula (V) or (VI);

(I)

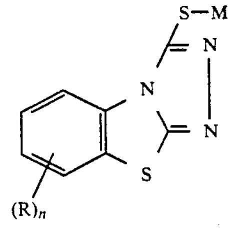

(II)

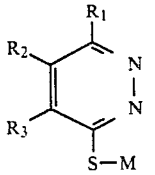

(III)

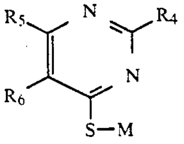

(IV)

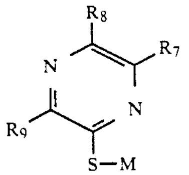

(V)

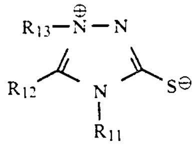

(VI)

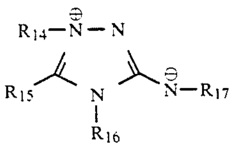

wherein M represents a hydrogen atom, an alkali metal atom, an ammonium group, or a group cleaving under an alkaline condition; R represents a group capable of substituting the hydrogen atom; n represents zero or an integer of from 1 to 4; and $R_1$, $R_2$, $R_3$, $R_4$, $R_5$, $R_6$, $R_7$, $R_8$, and $R_9$ each represents a hydrogen atom, —SM' (M' has the same meaning as M), a substituted or unsubstituted alkyl group, a substituted or unsubstituted aryl group, a substituted or unsubstituted alkenyl group, a substituted or unsubstituted aralkyl group, a substituted or unsubstituted alkylthio group, a substituted or unsubstituted carbonamido group, a substituted or unsubstituted sulfonamido group, a substituted unsubstituted ureido group, a substituted or unsubstituted thioureido group, a substituted or unsubstituted alkyl or aryl oxycarbonylamino group, or a substituted or unsubstituted amino group; the herocyclic ring of aforesaid formula (II), (III) or (IV) may be further condensed with a carbon aromatic ring; $R_{11}$, $R_{12}$, $R_{13}$, $R_{14}$, $R_{15}$, $R_{16}$, and $R_{17}$ each represents a substituted or unsubstituted alkyl group, a substituted or unsubstituted alkenyl group, a substituted or unsubstituted cycloalkyl group, a substituted or unsubstituted aryl group, or a substituted or unsubstituted heterocyclic group; and $R_{11}$ and $R_{12}$, $R_{12}$ and $R_{13}$, $R_{14}$ and $R_{15}$, or $R_{15}$ and $R_{16}$ may combine with each other to form a ring; $R_{12}$ and $R_{15}$ may be a hydrogen atom.

The inventors have discovered that in the case of forming direct positive images by developing a photographic light-sensitive material containing unprefogged internal latent image in the presence of a nucleating agent, direct positive images having the sufficiently high maximum image density and the sufficiently low minimum image density are astonishingly obtained when the development is performed in the presence of at least one compound shown by the aforesaid formula (I), (II), (III), (IV) (V) or (VI) and have succeeded in attaining the present invention based on the discovery.

DETAILED DESCRIPTION OF THE INVENTION

Then, the invention is described in detail.

The compounds shown by the aforesaid formula (I), (II), (III), (IV), (V) or (VI) do not function as a nucleating agent by themselves but have a function as so-called "nucleation accelerator" which accelerates the action of a nucleating agent.

First, the compounds shown by formula (I), (II), (III), and (IV) are explained in detail.

In the aforesaid formulae, M represents a hydrogen atom, an alkali metal atom (e.g., sodium and potassium), an ammonium group (e.g., trimethylammonium and dimethylbenzylammonium), or a group capable of become a hydrogen atom or an alkali metal atom under an alkaline condition (e.g., acetyl, cyanoethyl and methanesulfonylethyl). In the present invention an alkaline condition is a conventional development condition (usually the temperature is from the room temperature (about 25° C.) to 50° C., preferably from 30 to 40° C. and pH is from 8.0 to 12.0, preferably 9.5 to 11.0).

R represents a group capable of substituting the hydrogen atom in the benzene ring in formula (I). Example of the substitutable group are a nitro group, a halogen atom (e.g., chlorine and bromine), —SM" (M" has the same meaning as M) a cyano group, a substituted or unsubstituted alkyl group, a substituted or unsubstituted aryl group, a substituted or unsubstituted alkenyl group, a substituted or unsubstituted aralkyl group, a substituted or unsubstituted alkylsulfonyl group, a substituted or unsubstituted arylsulfonyl group, a substituted or unsubstituted carbamoyl group, a substituted or unsubstituted sulfamoyl group, a substituted or unsubstituted alkylcarbonamido, a substituted or unsubstituted arylcarbonamido group, a substituted or unsubstituted alkylsulfonamido group, a substituted or unsubstituted arylsulfonamido group, a substituted or unsubstituted aliphatic or aromatic acyloxy group, a substituted or unsubstituted alkylsulfonyloxy group, a substituted or unsubstituted arylsulfonyloxy group, a substituted or unsubstituted ureido group, a substituted or unsubstituted thioureido group, a substituted or unsubstituted aliphatic or aromatic acyl group, a substituted or unsubstituted alkoxycarbonyl group, a substituted or unsubstituted aryloxycarbonyl group, a substituted or unsubstituted alkoxycarbonylamino group, a substituted or unsubstituted aryloxycarbonylamino group, a substituted or unsubstituted alkoxy group, a substituted or unsubstituted aryloxy group, a substituted or unsubstituted alkylthio group, a substituted or unsubstituted arylthio group, a substituted or unsubstituted amino group, a $COOM_1$ or $SO_3M_1$ (wherein $M_1$ represents H, an alkali metal atom such as Na, K, or an ammonium group), and a hydroxy group. In the present invention groups having a term "aliphatic" or "aromatic" mean that the groups have an alkyl, alkenyl or alkynyl moiety and a phenyl or naphthyl moiety, respectively.

The total carbon number of R is preferably not more than 20, and more preferably not more than 10.

Examples of preferred substituents include an alkyl group, an aryl group (e.g., phenyl), an unsubstituted amino group, a substituted amino group with at least one of an alkyl group and an aryl group (e.g., dimethyl amino), an adduct (salt) of an amino group with an acid such as hydrochloric acid (e.g., $-N(CH_3)_2.HCl$), an alkyl thio group (e.g., methylthio), a cyano group, an alkoxy group (e.g., methoxy), an alkylsulfonamido (e.g., methanesulfone amido), a halogen atom (e.g., chlorine), a nitrogen-containing heterocyclic group (e.g., 1-imidazolyl and 2-pyridyl), an alkyl sulfonyl (e.g., methanesulfonyl), a carboxyl group, and an alkoxycarbonyl group. These groups may be further substituted by at least one of the above-described substituents.

Examples of preferred group represented by R include a methyl, ethyl, propyl, t-butyl, dimethylaminoethyl, cyanoethyl, phenyl, 4-methanesulfonamidophenyl, 4-methylphenyl, 3,4-dichlorophenyl, naphthyl, allyl, benzyl, 4-methylbenzyl, phenethyl, methanesulfonyl, ethanesulfonyl, p-toluenesulfonyl, carbamoyl, methylcarbamoyl, phenylcarbamoyl, sulfamoyl, methylsulfamoyl phenylsulfamoyl, acetamido, benzamido, methanesulfonamido, benzenesulfonamido, p-toluenesulfonamido, acetyloxy, benzyloxy, methanesulfonyloxy, ureido, methylureido, ethylureido, phenylureido, thioureido, methylthioureido, acetyl benzoyl, methoxycarbonyl, phenoxycarbonyl, methoxycarbonylamino, phenoxycarbonylamino, 2-ethylhexyloxycarbonylamino, methoxy, ethoxy, methoxyethoxy, phenoxy, 4-methylphenoxy, methylthio, ethylthio, phenylthio, amino, dimethylamino, methoxyethylamino and anilino groups.

In formula (I), n represents zero or an integer of from 1 to 4.

The total carbon number of groups represented by $R_1$ to $R_9$ is preferably not more than 20, more preferably not more than 10.

Examples of substituents for substituted groups represented by $R_1$ to $R_9$ are the same as those for R described above.

$R_1$, $R_2$, $R_3$, $R_4$, $R_5$, $R_6$, $R_7$, $R_8$, and $R_9$ each represents a hydrogen atom, a mercapto group, a substituted or unsubstituted alkyl group (e.g., methyl, ethyl, propyl, t-butyl, methoxyethyl, methylthioethyl, dimethylaminoethyl, morphilinoethyl, dimethylaminoethylthioethyl, diethylaminoethyl, dimethylaminopropyl, dipropylaminoethyl, dimethylaminohexyl, methylthiomethyl, methoxyethoxyethoxyethyl, trimethylammonioethyl, and cyanoethyl), a substituted or unsubstituted aryl group (e.g., phenyl, 4-methanesulfonamidophenyl, 4-methylphenyl, 3-methoxyphenyl, 4-dimethylaminophenyl, 3,4-dichlorophenyl, and naphthyl), a substituted or unsubstituted alkenyl group (e.g., allyl), a substituted or unsubstituted aralkyl group (e.g., benzyl, 4-methylbenzyl, phenethyl, and 4-methoxybenzyl), a substituted or unsubstituted alkylthio group (e.g., methylthio, ethylthio, propylthio, methylthioethylthio, dimethylaminoethylthio, methoxyethylthio, morpholinoethylthio, dimethylaminopropylthio, piperidinoethylthio, pyrrolidinoethylthio, morpholinoethylthioethylthio, imidazolylethylthio, 2-pyridylmethylthio, and diethylaminoethylthio), a substituted or unsubstituted alkyl or aryl carbonamido group (e.g., acetamido, benzamido, methoxypropionamido, and dimethylaminopropionamido), a substituted or unsubstituted alkyl or aryl sulfonamido group (e.g., methanesulfonamido, benzenesulfonamido, and p-toluenesulfonamido), a substituted or unsubstituted ureido group (e.g., ureido, methylureido, ethylureido, methoxyethylureido, dimethylaminopropylureido, methylthioethylureido, morpholinoethyl ureido, and phenylureido), a substituted or unsubstituted thioureido group (e.g., thioureido, methylthioureido, and methoxyethylthioureido), a substituted or unsubstituted alkoxycarbonylamino group (e.g., methoxycarbonylamino, and 2-ethylhexyloxycarbonylamino), a substituted or unsubstituted aryloxycarbonylamino group (e.g., phenoxycarbonylamino), or a substituted or unsubstituted amino group (e.g., amino, dimethylamino, methoxyethylamino, and anilino).

Also, the heterocyclic ring shown by formula (II), (III), or (IV) described above may be condensed with a carbon aromatic ring by bonding $R_2$ and $R_1$ or $R_3$, $R_5$ and $R_6$, and $R_7$ and $R_8$. Furthermore, it is preferred that in formulae (I) to (IV), n is zero, or n is 1 or 2 and R is a substituted or unsubstituted alkyl group, and $R_1$ to $R_9$ each is a hydrogen atom, a mercapto group, a substituted or unsubstituted alkyl group, a substituted or unsubstituted alkylthio group, or $R_2$ and $R_1$ or $R_3$, $R_5$ and $R_6$, and $R_7$ and $R_8$ from a benzo-condensed ring.

In the compounds shown by formula (I) to (IV), the more preferred compounds are those shown by formula (I) described above and formula (II-A);

(II-A)

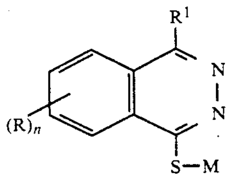

wherein M, R, $R_1$, and n have the same significance as defined on formulae (I) and (II).

Compounds represented by formulae (I) to (IV) can be synthesized by methods disclosed in, for example, *Advance in heterocyclic Chemistry*, Vol. 9, page 280 (1968), *Indian J. Chem.* Sect. B 16B(8), page 689 (1978), *J. Chem. Soc.*, 242 (1960), id., 108 (1958), id., 1004 (1951) *J. Org. Chem.*, Vol. 11, page 349 (1946), *J. Am. Chem. Soc.* Vol. 70, page 2423 (1948) and French Patent 1,192,194.

The compounds shown by aforesaid formulae (V) and (VI) are explained in detail.

In the formulae, the substituted groups represented by $R_{11}$, $R_{12}$, $R_{13}$, $R_{14}$, $R_{15}$, $R_{16}$, and $R_{17}$ may have any substituent disclosed hereinabove as examples of substituents of the substituted groups represented by R in formula (I).

In the formulae $R_{11}$ to $R_{17}$ each represents a substituted or unsubstituted alkyl group having preferably from 1 to 30 carbon atoms (e.g., methyl, ethyl, n-propyl, t-butyl, isobutyl, n-pentyl, n-undecyl, n-heptadecyl, methoxymethyl, methoxyethyl, benzyl, phenethyl, dimethylaminoethyl, diethylaminopropyl, and methylthioethyl), a substituted or unsubstituted alkenyl group having preferably from 3 to 30 carbon atoms (e.g., allyl), a substituted or unsubstituted cycloalkyl group having from 3 to 30 carbon atoms (e.g., cyclohexyl), a substituted or unsubstituted aryl group having preferably from 6 to 30 carbon atoms (e.g., phenyl, naphthyl, 4-methylphenyl, 4-carboxyphenyl, 3,4-dichlorophenyl, 4-methanesulfonylphenyl, 4-chlorophenyl, and 4-ethoxycarbonylphenyl), or a substituted or unsubstituted heterocyclic group having preferably from 1 to 30 carbon atoms and at least one of N, O and S atoms as a hetero atom and which is preferably 5- to 7-membered ring (e.g., 2-pyridyl, 4-pyridyl, 2-thienyl, 3-furyl, and 2-quinolyl), and $R_{11}$ and $R_{12}$, $R_{12}$ and $R_{13}$, $R_{14}$ and $R_{15}$ or $R_{15}$ and $R_{16}$ may combine with each other to form a ring which is preferably a 5- to 6-membered saturated carbon ring. $R_{12}$ and $R_{15}$ may be hydrogen atom.

The compound shown by formula (V) to (VI) may form a salt of an acid (e.g., acetic acid, nitric acid, salycilic acid, chloric acid, iodic acid, and bromic acid).

In formula (V) Or (VI), $R_1$, $R_{12}$, $R_{13}$, $R_{14}$, $R_{15}$, $R_{16}$, and $R_{17}$ each preferably represents a substituted or unsubstituted alkyl group having from 1 to 10 carbon atoms or a substituted or unsubstituted aryl group having from 6 to 20 carbon atoms.

The compounds shown by aforesaid formula (V) or (VI) can be synthesized by the methods described in *Journal of Heterocyclic Chemistry,* 2, 105(1965), *Journal of Organic Chemistry,* 32, 2245(1967), *Journal of Chemical Society,* 3799(1969), *Journal of American Chemical Society,* 80, 1895(1958), *Chemical Communication,* 1222(1971), *Tetrahedron Letters,* 2939 (1972), JP-A-60-87322, *Berichte der Deutschen Chemischen Gesellschaft,* 38, 4049(1905), *Journal of Chemical Society Chemical Communication,* 1224(1971), JP-A-60-12293, 60-117240, etc.

Then, specific examples of the compounds shown by formula (I) to (IV) are illustrated below but the invention is not limited to these compounds. Compounds (A-1) to (A-20) are represented by formula (I) to (IV), and compounds (B-1) to (B-29) are represented by formula (V) or (VI).

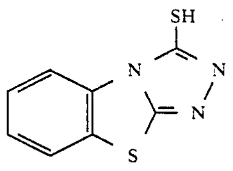

(A-1)

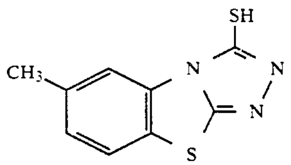

(A-2)

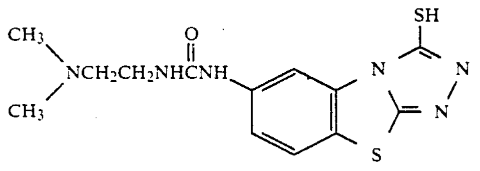

(A-3)

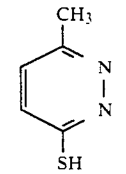

(A-4)

-continued

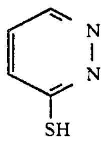

(A-5)

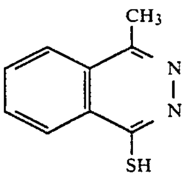

(A-6)

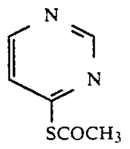

(A-7)

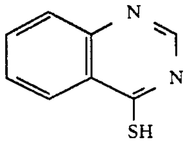

(A-8)

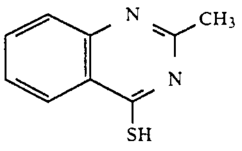

(A-9)

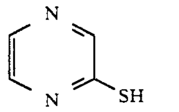

(A-10)

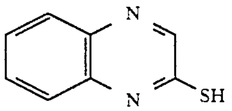

(A-11)

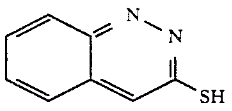

(A-12)

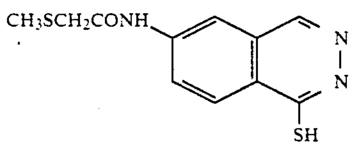

(A-13)

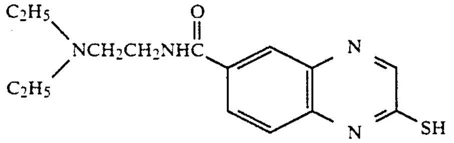

(A-14)

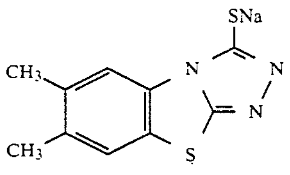

(A-15)

-continued
(A-16)
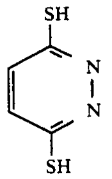
(A-17)
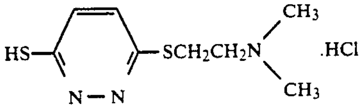
(A-18)
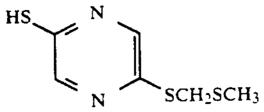
(A-19)
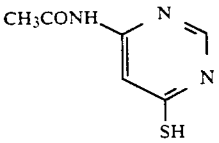
(A-20)
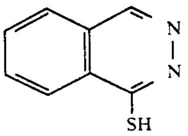
(B-1)
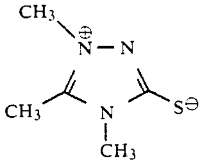
(B-2)
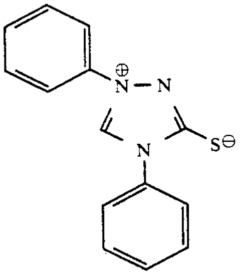
(B-3)
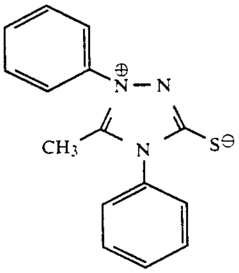
-continued
(B-4)
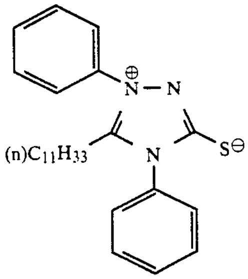
(B-5)
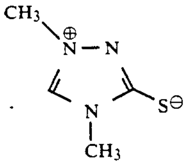
(B-6)
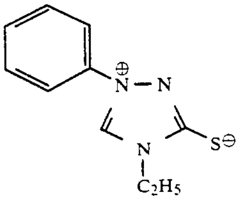
(B-7)
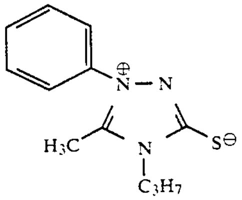
(B-8)
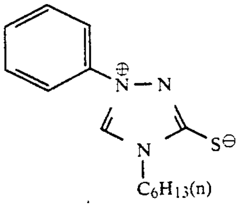
(B-9)
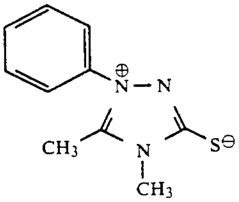
(B-10)
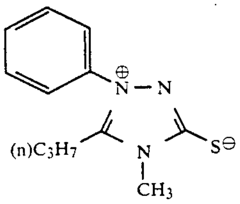

-continued
(B-11)
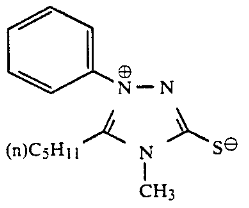
(B-12)
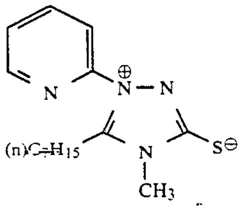
(B-13)
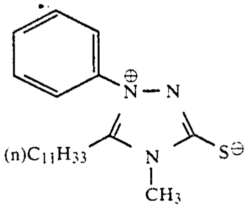
(B-14)
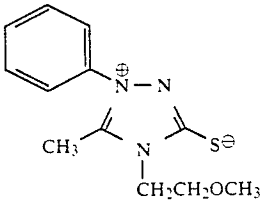
(B-15)
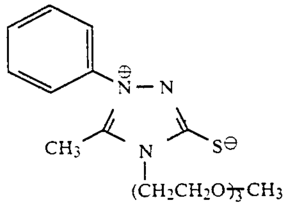
(B-16)
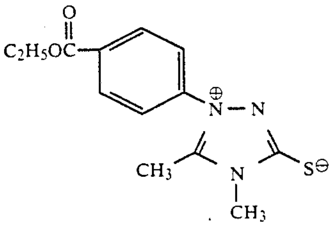
(B-17)
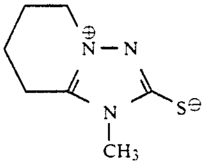
-continued
(B-18)
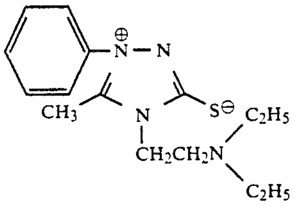
(B-19)
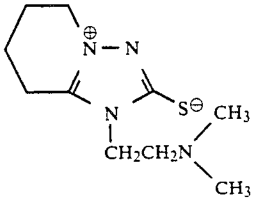
(B-20)
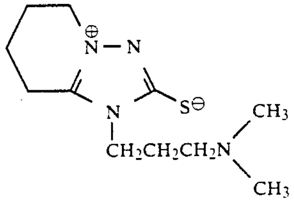
(B-21)
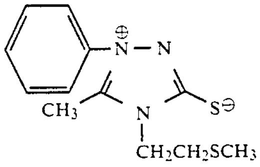
(B-22)
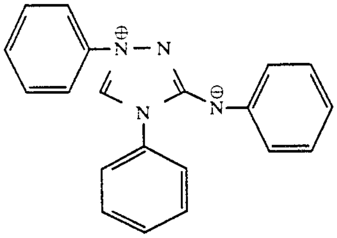
(B-23)
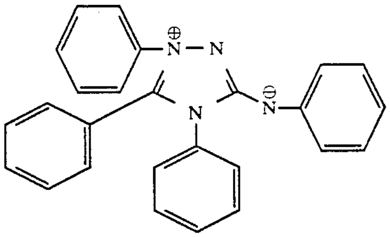
(B-24)
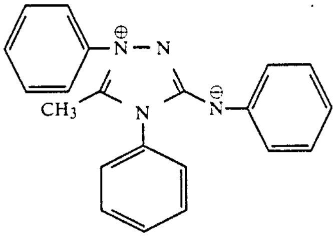

-continued (B-25)

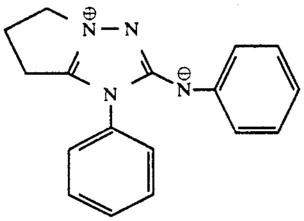

(B-26)

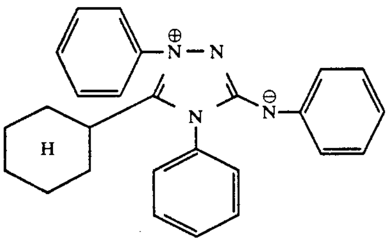

(B-27)

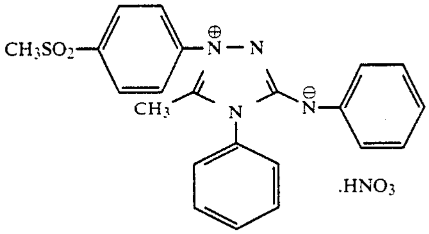

(B-28)

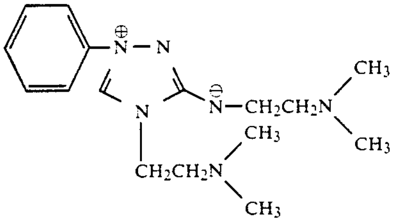

(B-29)

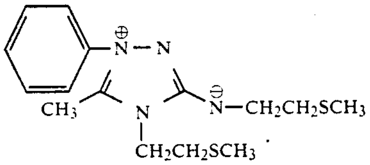

These nucleation accelerators can be contained in not only the light-sensitive material but also in processing solutions. They are preferably incorporated in the light-sensitive layers, particularly in the internal latent-image type silver halide emulsion layers or other hydrophilic colloid layers (e.g., an interlayer, or a protective layer). They are particularly preferably incorporated in silver halide emulsion layers or their adjacent layers. Two or more of nucleation accelerators may also be used in combination.

When the nucleation accelerator is incorporated into a silver halide emulsion layer, it is preferably incorporated in an amount of from $1\times10^{-6}$ to $1\times10^{-2}$ mol, more preferably $1\times10^{-5}$ to $1\times10^{-2}$ mol per mol of silver halide, when it is incorporated into the abovedescribed hydrophilic colloid layer, it is preferably incorporated in an amount of from $5\times10^{-6}$ to $5\times10^{-2}$ g/m$^2$, more preferably from $5\times10^{-5}$ to $5\times10^{-2}$ g/m2, and when it is incorporated into a processing solution, i.e., a developing solution and/or a prebath thereof, it is preferably incorporated in an amount of from $1\times10^{-8}$ to $1\times10^{-3}$ mol/l, more preferably from $1\times10^{-7}$ to $1\times10^{-4}$ mol/l. When the amount exceeds these ranges the nucleation accelerating effect tends to decrease thereby Dmax decreases.

The compounds represented by formulae (I) to (VI) are incorporated into a photographic material by dissolving the compounds into a solvent which is conventionally used in a photographic material such as water, methanol, ethanol, propanol or a fluorinated alcohol, and adding the thus obtained solution to a hydrophilic colloidal solution.

When the compounds are incorporated into a silver halide emulsion layer, incorporation of the compound may be carried out at any step, which is selected according on the object, e.g., at a silver halide grain formation step, or a physical ripening step, just before a chemical ripening step, during a chemical ripening step or during preparation of a coating liquid.

The unprefogged, internal latent-image type silver halide emulsion employed in the present invention contains silver halide grains whose surfaces are not prefogged, and which form the latent image predominantly inside the grain. More specifically, it is defined as the emulsion which gains at least 5-fold, preferably at least 10-fold, maximum density when a silver halide emulsion is coated on a transparent support at a prescribed coverage (e.g., 0.5 to 3 g/m$^2$ based on the silver halide), exposed to light for a fixed period of time (e.g., 0.01 to 10 sec.), and then developed at 18° C. for 5 min. using the developer A described below (internal developer), and thereafter the maximum density is determined according to a usual photographic density measuring method, compared with the case where the silver halide emulsion coated at the same coverage is exposed in the same manner, and developed at 20° C. for 6 minutes using the developer B described below (surface developer).

| | |
|---|---|
| Internal Developer A | |
| Metol | 2 g |
| Sodium Sulfite (anhydrous) | 90 g |
| Hydroquinone | 8 g |
| Sodium Carbonate (monohydrate) | 52.5 g |
| KBr | 5 g |
| KI | 0.5 g |
| Water to make | 1 l |
| Surface Developer B | |
| Metol | 2.5 g |
| L-ascorbic Acid | 10 g |
| $NaBO_2.4H_2O$ | 35 g |
| KBr | 1 g |
| Water to make | 1 l |

Specific examples of internal latent-image type emulsions include conversion type emulsions disclosed in U.S. Pat. No. 2,592,250, and core/shell type silver halide emulsions disclosed in U.S. Patents 3,761,276, 3,850,637, 3,923,513, 4,035,185, 4,395,478 and 4,504,570, JP-A-52-156614, JP-A-55-127549, JP-A-53-60222, JP-A-56-22681, JP-A-59-208540, JP-A-60-107641, JP-A-61-3137, JP-A-62-215272, and patents disclosed in *Research Disclosure*, No. 23510, p. 236 (Nov. 1983).

The silver halide grains to be used in the present invention may have a regular crystal form, such as a cube, an octahedron, a dodecahedron, a tetradecahedron or so on, an irregular crystal form, such as a sphere or so on, or a tabular form having an aspect ratio (a length/thickness ratio) of 5 or above. In addition, silver halide grains having a composite form of these various crystal forms may be used, or a mixture of emulsions containing various crystal forms of silver halide grains may be used.

Silver halides which may constitute the emulsion grains of the present invention include silver chloride, silver bromide and mixed silver halides. Preferred silver halides in the present invention are silver chloro(iodo)-bromide, silver (iodo)chloride and silver (iodo)bromide, in which the iodide content is below 3 mol%.

The silver halide grains have a mean grain size of preferably from 0.1 to 2 μm, particularly preferably from 0.15 to 1 μm. The size distribution of the silver halide grains to be used in the present invention, though it may be narrow or broad, is preferably "monodisperse" to improve in granularity, sharpness and so on. The term "monodisperse system" as used herein refers to a dispersion system wherein 90% or more of the grains have individual sizes within the range of ±40% of the number or weight average grain size, and preferably within ±20%. In order to satisfy the gradation aimed at, two or more monodisperse silver halide emulsions, which have substantially the same color sensitivity, but different grain sizes, or plural kinds of grains having the same size but different sensitivities can be coated as a mixture in the same layer, or separately in superposed layers. In addition, a combination of two or more of polydisperse silver halide emulsions, or a combination of monodisperse and polydisperse emulsions can be used as a mixture, or coated separately in superposed layers.

The interior or the surface of silver halide emulsion grains to be used in the present invention can be chemically sensitized by using a sulfur or selenium sensitization process, a reduction sensitization process, a noble metal sensitization process and so on individually or in a combination thereof. Specific examples of these processes are described in patents cited, e.g., in *Research Disclosure,* No. 17643-III, p. 23 (Dec. 1978).

The photographic emulsions used in the present invention are spectrally sensitized using photographic sensitizing dyes in accordance with a conventional method. Particularly useful sensitizing dyes are cyanine dyes, merocyanine dyes, and complex merocyanine dyes. These dyes can be used independently or in combination thereof. In addition, the foregoing dyes may be used in combination with supersensitizing agents. Specific examples for these dyes and agents are described in patents cited, e.g., in *Research Disclosure,* No. 17643-IV, pp. 23–24 (Dec. 1978).

The photographic emulsions to be used in the present invention can contain an antifoggant or a stabilizer for the purpose of preventing fog or stabilizing photographic functions during production, storage, or photographic processing. Specific examples of such agents are described in *Research Disclosure,* No. 17643-VI (Dec. 1978), and E. J. Birr, *Stabilization of Photographic Silver Halide Emulsion,* Focal Press (1974).

The fogging processing of this invention is performed by the following "optical fogging method" and/or "chemical fogging method".

The overall exposure, that is, the fogging exposure in the "optical fogging method" of this invention is performed after imagewise exposure and before and/or during development. That is, an imagewise exposed light-sensitive material is subjected to the overall exposure for fogging during the immersion in a developer or in the pre-bath for a developer or after withdrawing from the pre-bath or a developer and before drying but it is preferred to subject the light-sensitive material to the overall exposure in a developer.

As a light source for the fogging exposure, a light source in the light-sensitive wavelength region of the light-sensitive material and in general, a fluorescent lamp, a tungsten lamp, a xenon lamp, sun light, etc., can be used. Practical examples thereof are described in British Patent 1,151,363, JP-B-45-12710, 45-12709, and 58-6936, JP-A-48-9727, 56-137350, 57-29438, 58-62652, 58-60739, 58-70223 (U.S. Pat. No. 4,440,851), and 59-120240, and European Patent 89,101A2.

For a light-sensitive material having light sensitivity to the whole wavelength region, such as a color photographic light-sensitive material, a light source having a color rendering property (near white) as described in JP-A-56-137350 and 58-70223 is preferred. The illuminance of the light exposure is generally from 0.01 to 2000 lux, preferably from 0.05 to 30 lux, and more preferably from 0.05 to 5 lux. For a light-sensitive material using a silver halide emulsion having a higher speed, the exposure of lower illuminance is preferred. The illuminance may be controlled by changing the luminous intensity of a light source, decreasing the intensity of light by changing filter, or changing the distance between the light-sensitive material and the light source or the angle of the light source to the light-sensitive material. Also, the illuminance of the aforesaid fogging exposure can be continuously or stepwise increased from a low illuminance to a high illuminance.

It is preferred that a light-sensitive material is immersed in a developer or a pre-bath thereof and after sufficiently impregnating the emulsion layers of the light-sensitive material with the solution, the light- c sensitive material is irradiated by light. The time from the impregnation of the solution to the exposure for the light fogging is generally from 2 seconds to 2 minutes, preferably from 5 seconds to one minute, and more preferably from 10 seconds to 30 seconds.

The exposure time for fogging is generally from 0.01 second to 2 minutes, preferably from 0.1 second to one minutes, and more preferably from one second to 40 seconds.

The nucleating agent which is used in the case of applying so-called "chemical fogging method"in this invention can be incorporated in a light-sensitive material or a processing solution (such as a developer or a pre-bath thereof) for a light-sensitive material but is preferably incorporated in a light-sensitive material.

In this invention, "nucleating agent" is a material having a function of acting to an internal latent image type silver halide emulsion which has not previously fogged in the case of surface developing it to form direct positive images. In this invention, it is particularly preferred to apply the fogging processing by the nucleating agent.

When the nucleating agent is incorporated in a light-sensitive material, it is preferred to incorporate the nucleating agent in the silver halide emulsion layer of the light-sensitive material but the agent may be incorporated in other layer such as an interlayer, a subbing layer, a back layer, etc., of the light-sensitive material if the agent can adsorb onto silver halide by diffusing into the emulsion layer during coating the layer or during processing the light-sensitive material.

When the nucleating agent is added to a processing solution, the agent may be added to a developer or a prebath having low pH as described in JP-A-58-178350.

Examples of the nucleating agents which can be used in this invention are described in the specification of JP-A-58-178350, page 50, line 1 to page 53 and the compounds shown by formulae [N - I] and [N - II] in the specification are preferably used.

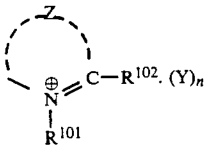

(N-I)

Z represents a group of non-metallic atoms which are required to form a five- or six-membered heterocyclic ring such as a quinoline ring, a benzothiazole ring, a 1,2,3,4-tetrahydroacridine ring, a 2,3-pentamethylene quinoline ring, and a pyridine ring, and Z may be substituted with substituent groups.

Examples of the substituent groups include a nitro group, a halogen atom (e.g., Cl, Br), a mercapto group, a cyano group, a substituted or unsubstituted alkyl group (e.g., ethyl, methyl, propyl, tert-butyl, cyanoethyl), an aryl group (e.g., phenyl, 4-methanesulfonamidophenyl, 4-methylphenyl, 3,4-dichlorophenyl, naphthyl), an alkenyl group (e.g., allyl), an aralkyl group (e.g., benzyl, 4-methylbenzyl, phenethyl), an alkyl- or aryl-sulfonyl group (e.g., methanesulfonyl, ethanesulfonyl, p-toluenesulfonyl), a carbamoyl group (e.g., unsubstituted carbamoyl, methylcarbamoyl, phenylcarbamoyl), a sulfamoyl group (e.g., unsubstituted sulfamoyl, methylsulfamoyl, phenylsulfamoyl), a carbonamido group (e.g., acetamido, benzamido), a sulfonamido group (e.g., methanesulfonamido, benzenesulfonamido, p-toluenesulfonamido), an acyloxy group (e.g., acetoxyl, benzoyloxyl), an alkyl- or arylsulfonyloxyl group (e.g., methanesulfonyloxyl), a ureido group (e.g., unsubstituted ureido, methylureido, ethylureido, phenylureido), a thioureido group (e.g., unsubstituted thioureido, methylureido), an acyl group (e.g., acetyl, benzoyl), an alkyl- or aryl-oxycarbonyl group (e.g., methoxycarbonyl, phenoxycarbonyl), an alkyl- or aryloxycarbonylamino group (e.g., methoxycarbonylamino, phenoxycarbonylamino, 2-ethylhexyloxycarbonylamino), $-COOM_1$ Or $-SO_3M_1$ (wherein $M_1$ represents a hydrogen atom, an alkali metal atom such as Na and K, and an ammonium group) and a hydroxyl group.

$R^{101}$ is an aliphatic group and $R^{102}$ is a hydrogen atom, aliphatic grOup or an aromatic group. $R^{101}$ and $R^{102}$ may be substituted with substituent groups. Furthermore, $R^{102}$ and Z may be joined together to form a ring. However, at least one of the groups represented by $R^{101}$, $R^{102}$ and Z represents an alkynyl group, acyl group, hydrazino group or a hydrazono group, or $R^{101}$ and $R^{102}$ form a six-membered ring and a dihydropyridinum skeleton is formed. Moreover, at least one of the substituent groups Of $R^{101}$, $R^{102}$ and Z may have an $X^1$-$(L^1)^m$- group. Here $X^1$ is a group Which promotes adsorption on silver halide, and $L^1$ is a divalent linking group. Y is a counter ion for balancing the electrical charge, n is 0 or 1 and m is 0 or 1.

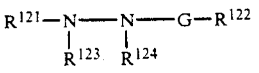

(N-II)

$R^{121}$ represents an aliphatic group, aromatic group or a heterocyclic group, $R^{122}$ represents a hydrogen atom, alkyl group, aralkyl group, aryl group, alkoxy group, aryloxy group or an amino group, G represents a carbonyl group, sulfonyl group, sulfoxy group, phosphoryl group or an iminomethylene group (NH=C<), and $R^{123}$ and $R^{124}$ both represent hydrogen atoms or one represents a hydrogen atom and the other represents an alkylsulfonyl group, arylsulfonyl group or an acyl group. Furthermore, a hydrazone structure (>N—N=C<) may be formed containing G, $R^{123}$, $R^{124}$ and the hydrazine nitrogen. Further, the groups mentioned above can, where possible, be substituted with substituent groups.

The, specific examples of the compound shown by the aforesaid formula [N-I] are illustrated below although the invention is not limited to them.

| | |
|---|---|
| [N-I-1] | 5-Ethoxy-2-methyl-1-propargylquinolinium bromide |
| [N-I-2] | 2,4-Dimethyl-1-propargylquinolinium bromide |
| [N-I-3] | 2-Methyl-1-{3-[2-(4-methylphenyl)hydrazono]butyl}quinolinium iodide |
| [N-I-4] | 3,4-Dimethyl-dihydropyrido[2,1-b]benzothiazolium bromide |
| [N-I-5] | 6-Ethoxythiocarbonylamino-2-methyl-1-propargylquinolinium trifluoromethanesulfonate |
| [N-I-6] | 2-Methyl-6-(3-phenylthioureido)-1-porpargylquinolinium bromide |
| [N-I-7] | 6-(5-Benzotriazolecarboxamido)-2,1-methyl-1-ropargylquinolinium trifluoromethanesulfonate |
| [N-I-8] | 6-[3-(2-Mercaptoethyl)ureido]-2-methyl-1-propargylquinolinium trifluoromethanesulfonate |
| [N-I-9] | 6-{3-[3-(5-Mercapto-1,3,4-thiadiazol-2-ylthio)propyl]ureido}-2-methyl-1-propargylquinolinium trifluoromethanesulfonate |
| [N-I-10] | 6-(5-Mercaptotetrazol-1-yl)-2-methyl-1-propargylquinolinium iodide |
| [N-I-11] | 1-Propargyl-2-(1-propenyl)quinolinium trifluoromethanesulfonate |
| [N-I-12] | 6-Ethoxythiocarbonylamino-2-(2-methyl-1-propenyl)-1-proparygylquinolinium trifluoromethanesulfonate |
| [N-I-13] | 10-Propargyl-1,2,3,4-tetrahydroacrydinium trifluoromethanesulfonate |
| [N-I-14] | 7-Ethoxythiocarbonylamino-10-propargyl-1,2,3,4-tetrahydroacrydinium trifluoromethanesulfonate |
| [N-I-15] | 6-Ethoxythiocarbonylamino-1-propargyl-2,3-pentamethylenequinolinium trifluoromethanesulfonate |
| [N-I-16] | 7-[3-(5-Mercaptotetrazol-1-yl)benzamido]-10-propargyl-1,2,3,4-tetrahydro-acrydinium perchlorate |
| [N-I-17] | 6-[3-(5-Mercaptotetrazol-1-yl) benzamido]-1-propargyl-2,3-pentamethylenequinolinium bromide |
| [N-I-18] | 7-(5-Mercaptotetrazol-1-yl)-9-methyl-10-propargyl-1,2,3,4-tetrahydroacrydinium bromide |
| [N-I-19] | 7-[3-N-[2-(5-Mercapto-1,3,4-thiadizol-2-yl)thioethyl]carbamoyl propaneamido]-10-proparygyl-1,2,3,4-tetrahydroacrydinium tetrafluoroborate |
| [N-I-20] | 6-(5-Mercaptotetrazol-1-yl)-4-methyl-1-propargyl-2,3-pentamethylenequinolinium bromide |
| [N-I-21] | 7-Ethoxythiocarbanylamino-10-propargyl-1,2-dihydroacrydinium trifluoromethanesulfonate |
| [N-I-22] | 7-(5-Mercaptotetrazol-1-yl)-9-methyl-10-propargyl-1,2-dihydroacrydinium hexafluorophosphate |
| [N-I-23] | 7-[3-(5-Mercaptotetrazol-1-yl) benzamido]-10-propargyl-1,2- |

-continued

| |
|---|
| dihydroacrydinium bromide |

Specific examples of the compound shown by formula [N-II] are illustrated below although the invention is not limited to them.

| | |
|---|---|
| [N-II-1] | 1-Formyl-2-{4-[3-(2-methoxyphenyl) ureido]phenyl}hydrazine |
| [N-II-2] | 1-Formyl-2-{4-[3-{3-[3-(2,4-di-tert-pentylphenoxy)propyl]ureido}phenylsulfonylamino]phenyl}hydrazine |
| [N-II-3] | 1-Formyl-2-{4-[3-(5-mercaptotetrazol-1-yl)benzamido]phenyl}hydrazine |
| [N-II-4] | 1-Formyl-2-[4-{3-(3-(5-mercapto-tetrazol-1-yl)phenyl]ureido}phenyl] hydrazine |
| [N-II-5] | 1-Formyl 2-[4-{3-[N-(5-Mercapto-4-methyl-1,2,4 trrazol-3-yl)carbamoyl) propaneamido}phenyl]hydrazine |
| [N-II-6] | 1-Formyl-2-{4-[3-{N-[4-(3-mercapto-1,2,4-triazol-4-yl)phenyl]carbamoyl} propaneamido]-phenyl}hydrazine |
| [N-II-7] | 1-Formyl-2-[4-(3-[N-(5-mercapto-1,3,4-thiadiazol-2-yl)carbamoyl]propane-amido}phenyl]-hydrazine |
| [N-II-8] | 2-[4-Benzotriazole-5-carboxamido) phenyl]-1-formylhydrazine |
| [N-II-9] | 2 -[4-{3-[N-(benzotriazole-5-carboxamido)-carbamoyl]propaneamido} phenyl]-1-formylhydrazine |
| [N-II-10] | 1-Formyl-2-{4-[1-(N-phenylcarbamoyl)-thiosemicarbamido]phenyl}hydrazine |
| [N-II-11] | 1-Formyl-2-{4-[3-(3-phenylthioureido)-benzamido]phenyl}-hydrazine |
| [N-II-12] | 1-Formyl-2-[4-(3-hexylureido)phenyl]-hydrazine |
| [N-II-13] | 1-Formyl-2-{4-[3-(5-mercaptotetrazol-1-yl)benzenesulfonamido]phenyl}hydrazine |
| [N-II-14] | 1-Formyl-2-{4-[3-{3-[3-(5-mercapto-tetrazol-1-yl)phenyl]ureido}benzene-sulfonamido]-phenyl}hydrazine |

The nucleating agents may be used singly or as a mixture thereof.

In incorporating the nucleating agent into the photographic light-sensitive material to be used in the present invention, they are first dissolved in an organic solvent miscible with water, such as alcohols (e.g., methanol, ethanol), esters (e.g., ethyl acetate), ketones (e.g., acetone), or the like, or in water when they are soluble in water, and then added to a hydrophilic colloidal solution.

The addition to a photographic emulsion may be carried out at any time as long as it is within the period from the start of chemical ripening till the start of coating. However, it is desirable to carry out the addition after the conclusion of chemical ripening.

In the present invention, the nucleating agent may be contained in a hydrophilic colloid layer adjacent to a silver halide emulsion layer. It is preferably incorporated in a silver halide emulsion layer. Although the amount of the nucleating agent to be added can vary over a wide range because it depends on characteristics of the silver halide emulsion used, the chemical structure of the nucleating agent and the developing condition adopted, a practically useful amount ranges from about $1\times10^{-8}$ mole to about $1\times10^{-2}$ mole, particularly from about $1\times10^{-7}$ mole to about $1\times10^{\times3}$ mole, per mole of silver in the silver halide emulsion layer. When the nucleating agent is incorporated in a layer adjacent to a silver halide emulsion layer, it is preferably incorporated in an amount of from $1.0\times10^{-8}$ to $1.0\times10^{-2}$ g/m$^2$, more preferably $3.0\times10^{-8}$ to $1.0\times10^{-4}$ g/m$^2$.

When the nucleating agent is incorporated in a developing solution and/or a prebath thereof, it is preferably incorporated in an amount of from $1\times10^{-5}$ to $1\times10^{-1}$ mol/l, more preferably $1\times10^{-4}$ to $1\times10^{-2}$ mol/l. In the prebath compounds other than nucleating agent may also be added.

Various color couplers can be used for forming direct positive color images. The color couplers are compounds capable of producing or releasing substantially nondiffusible dyes by undergoing a coupling reaction with the oxidation products of aromatic primary amine color developing agents, and preferably they themselves also should be nondiffusible. Typical examples of useful color couplers include naphthol or phenol compounds, pyrazolone or pyrazoloazole compounds, and open-chain or heterocyclic ketomethylene compounds. Specific examples of these cyan, magenta and yellow couplers which can be used in the present invention are described in *Research Disclosure,* No. 17643, Item VII-D, p. 25 (Dec. 1978), ibid, No. 18717 (Nov. 1979), JP-A-62-215272, and patents cited therein.

Representative yellow couplers which can be used in the present invention include two-equivalent yellow couplers of the type which have a splitting-off group attached to the coupling active site via an oxygen or nitrogen atom. Of these yellow couplers, α-pivaloylacetoanilide couplers are most advantageous because they can produce dyes excellent in fastness, especially to light, while α-benzoylacetoanilide couplers have an advantage in that they can ensure high color density in the developed image.

As for the 5-pyrazolone type magenta couplers which can be used in the present invention, those containing an arylamino or acylamino group as a substituent group at the 3-position (particularly those of two-equivalent type, which have a splitting-off group attached to the coupling active site via a sulfur atom) are preferably used. More preferred magenta couplers are those of pyrazoloazole type, especially pyrazolo[5,1-c][1,2,4]tria-zoles disclosed in U.S. Pat. No. 3,725,067. From the viewpoints of reduced yellow side-adsorption and excellence of light fastness of the developed dyes, imidazo[1,2,-b]pyrazoles described in U.S. Pat. No. 4,500,630 are more preferred, and pyrazolo[1,5-b]-[1,2,4]triazoles described in U.S. Pat. No. 4,540,654 are particularly preferred.

Cyan couplers which can be preferably used in the present invention include naphthol type and phenol type couplers disclosed in U.S. Pat. Nos. 2,474,293 and 4,502,212, and phenol type couplers which have an ethyl or higher alkyl group at the meta-position of the phenol nucleus, which are disclosed in U.S. Pat. No. 3,772,002. In addition, couplers of 2,5-di-acylamino-substituted phenol type are advantageous in respect of fastness of the dye images produced.

Colored couplers for correction of unnecessary adsorption which the dyes produced have in a short wavelength region, couplers which can be converted to dyes having a moderate diffusibility as the result of color development, colorless couplers, DIR couplers which can release development inhibitors in proportion as the coupling reaction proceeds, and polymeric couplers can also be employed.

As for the above-described couplers and so on, two or more of them can be incorporated in the same layer in order to satisfy characteristics required of the light-sensitive material. Further, they can be used together with other magenta couplers.

The standard amount of a color coupler used ranges from 0.001 to 1 mole per mol of light-sensitive silver halide. More specifically, a preferred amount is within the range of 0.01 to 0.5 mole in the case of a yellow coupler, 0.03 to 0.5 mole in the case of a magenta coupler, and 0.002 to 0.5 mole in the case of a cyan coupler.

For the purpose of improving the color developability of couplers, a color development intensifying agent can be used in the present invention. Typical examples of such an agent are described in JP-A-62-215272, pp. 374–391.

Couplers are dissolved in a high boiling point organic solvent and/or a low boiling point organic solvent, emulsified and dispersed in an aqueous solution of gelatin or another hydrophilic colloid by high-speed stirring with a homogenizer or the like, by mechanical fine grinding with a colloid mill or the like, or by a technique utilizing ultrasonic waves, and then added to a silver halide emulsion. The incorporation of couplers into an emulsion layer, though not always requiring high boiling point organic solvents, is preferably carried out using the compounds described in JP-A-62-215272, pp. 440–467.

Couplers which can be employed in the present invention can be dispersed into a hydrophilic colloid using methods described in JP-A-62-215272, pp. 468–475, or U.S. Pat. No. 2,322,027.

Examples for a high boiling point solvent, such as a phthalic acid alkyl ester (e.g., dibutyl phthalate, dioctyl phthalate), a phosphoric acid ester (e.g., diphenyl phosphate, triphenyl phosphate, tricresyl phosphate, dioctyl butyl phosphate), a citric acid ester (e.g., tributyl acetylcitrate), a benzoic acid ester (e.g., octyl benzoate), an alkylamide (e.g., diethyllaurylamide), a fatty acid ester (e.g., dibutoxyethylsuccinate, diethyl azelate), a trimesic acid ester (e.g., tributyl trimesate)and an organic solvent having a boiling point of about 30° to 150° C., e.g., a lower alkyl acetate such as ethyl acetate, butyl acetate, etc., ethyl propionate, secondary butyl alcohol, methyl isobutyl ketone, β-ethoxyethyl acetate, and methyl cellosolve acetate. The foregoing high and low boiling organic solvents may be used as a mixture thereof.

A photographic material produced in accordance with the present invention may contain as a color fog inhibitor or a color stain inhibitor a hydroquinone derivative, an aminophenol derivative, an amine, a gallic acid derivative, a catechol derivative, an ascorbic acid derivative, a colorless coupler, a sulfonamidophenol derivative, or the like. Typical examples of color fog inhibitors and color stain inhibitors are described in JP-A-62-215272, pp. 600–663.

The photographic material of the present invention can contain various discoloration inhibitors. Typical organic discoloration inhibitors are hydroquinones, 6-hydroxychromanes, 5-hydroxycoumarans, spirochromanes, p-alkoxyphenols, hindered phenols including bisphenols as main members, gallic acid derivatives, methylenedioxybenzenes, aminophenols, hindered amines, and ether or ester derivatives thereof obtained by silylating or alkylating a phenolic hydroxyl group of each of the abovecited compounds. In addition, metal complex salts represented by (bissalicylaldoximato)-nickel complexes and (bis-N,N-dialkyldithiocarbamato)nickel complexes can be employed as discoloration inhibitors.

For the prevention of deterioration of yellow dye images due to heat, moisture and light, compounds having both hindered amine and hindered phenol moieties in the molecule, as described in U.S. Pat. No. 4,268,593, can produce a desirable effect. In order to prevent a magenta dye image from deterioration, particularly due to light, spiroindanes described in JP-A-56-159644, and chromanes substituted by a hydroquinone diether or monoether described in JP-A-55-89835 are employed to advantage.

Typical examples of these discoloration inhibitors are described in JP-A-62-215272, pp. 401-440.

The desired end can be usually achieved when the foregoing compounds are coemulsified with couplers in proportions of 5 to 100 wt.% to their corresponding couplers, and then incorporated in light-sensitive layers.

In order to prevent cyan dyes from deterioration due to heat and light, particularly light, it is effective to introduce an ultraviolet absorbent into both layers adjacent to the cyan color-forming layer. In addition, an ultraviolet absorbent can be incorporated into a hydrophilic colloid layer like a protective layer. Typical examples of ultraviolet absorbents are described in JP-A-62-215272, pp. 391-400.

As for the binder or the protective colloid contained in emulsion layers and interlayers of the photographic material of the present invention, gelatin is used to advantage. Also, hydrophilic colloids other than gelatin can be used.

To the photographic material of the present invention can be added dyes for prevention of irradiation and antihalation, an ultraviolet absorbent, a plasticizer, a brightening agent, a matting agent, an aerial fog inhibitor, a coating aid, a hardener, an antistatic agent, a slippability improving agent and so on. Examples of these additives are described in *Research Disclosure,* No. 17643, Item VIII-XIII, pp. 25-27 (Dec. 1978), and ibid, No. 18716, pp. 647-651 (Nov. 1979).

The present invention can also be applied to a multilayer multicolor photographic material having at least two emulsion layer having different color sensitivities on a support. A multilayer color photographic material has, in general, at least one red-sensitive emulsion layer, at least one green-sensitive emulsion layer and at least one blue-sensitive emulsion layer on a support. The order of these layers can be varied as desired. Preferably, a red-sensitive layer, a green-sensitive layer and a blue-sensitive layer are arranged in this order from the support side, or a green-sensitive layer, a red-sensitive layer and a blue-sensitive layer are arranged in this order from the support side. Each of the above-described emulsion layers may have two or more constituent layers differing in sensitivity, and a nonlight-insensitive layer may be sandwitched in between any two of the constituent layers having the same color sensitivity. Though it is general to incorporate a cyan dye-forming coupler in a red-sensitive emulsion layer, a magenta dye-forming coupler in a green-sensitive emulsion layer, and a yellow dye-forming coupler in a blue-sensitive emulsion layer, combinations other than the above-described one can be employed, if desired.

For the purpose of heightening the maximum image density, lowering of the minimum image density, improving the preservability of the sensitive material, increasing the developing speed, or so on, the following compounds can be incorporated in the sensitive material.

Specifically, there are cited hydroquinones (e.g., those described in U.S. Pat. Nos. 3,227,552 and 4,279,987), chromans (e.g., those described in U.S. Patent 4,268,621, JP-A-54-103031, and *Research Disclosure,* No. 18264, pp. 333–334 (Jun. 1979)), quinones (e.g., those described in *Research Disclosure,* No. 21206, pp. 433–434 (Dec. 1981), amines (e.g., those described in U.S. Pat. No. 4,150,993, and JP-A-58-174757), oxidizers (e.g., those described in JP-A-60-260039, *Research Disclosure,* No. 16936, pp. 10–11 (May 1978)), catechols (e.g., those described in JP-A-55-21013 and JP-A-55-65944), compounds capable of releasing a nucleating agent upon development (e.g., those described in JP-A-60-107029 (U.S. Pat. No. 4,724,199)), thioureas (e.g., those described in JP-A-60-95533 (U.S. Pat. No. 4,629,678)), and spirobisindanes (e.g., those described in JP-A-55-65944).

In the photographic material used in the present invention, it is desirable to provide, in addition to silver halide emulsion layers, proper auxiliary layers such as a protective layer, an interlayer, a filter layer, an antihalation layer, a backing layer, and a light-reflecting white layer.

Photographic emulsion layers and other layers to constitute the photographic light-sensitive material of the present invention are coated over a support such as described in *Research Disclosure,* No. 17643, Item XVII, p. 28 (Dec. 1978), European Patent 0,182,253, and JP-A-61-97655. Therein, coating methods described in *Research Disclosure,* No. 17643, Item XV, pp. 28–29 can be used.

The present invention can be applied to various kinds of color light-sensitive materials, including color reversal films for slide or television use, color reversal paper, and instant color films. In addition, the invention can be applied to full-color copying machines, color hard copies for preserving CRT (cathode ray tube) images, and the like. Moreover, the invention can be applied to a white-and-black light-sensitive material of the type which utilizes mixing of three color couplers, as described in *Research Disclosure,* No. 17123 (Jul. 1978).

Further, the present invention can be applied to black and white photographic materials.

Black and white (B/W) photographic materials which can utilize the present invention include B/W direct-positive photographic materials described in JP-A-59-208540 and JP-A-60-260039 (such as X-ray light-sensitive materials, duplicating light-sensitive materials, micrographic materials, photocomposing light-sensitive materials, and light-sensitive materials for printing).

A color developing solution to be used in the development-processing of the photographic material of the present invention is preferably an alkaline aqueous solution containing an aromatic primary amine type developing agent as a main component. As for the color developing agent, p-phenylenediamine compounds are preferred, though aminophenol compounds are useful, too. Typical examples of p-phenylenediamine compounds are 3-methyl-4-amino-N,N-diethylaniline, 3-methyl-4-amino-N-ethyl-N-8-hydroxyethylaniline, 3-methyl-4-amino-N-ethyl-N-8-methanesulfonamidoethylaniline, 3-methyl-4-amino-N-ethyl-N-8-methoxyethylaniline, and sulfates, hydrochlorides or p-toluenesulfonates of these anilines. These compounds can be used in combination of two or more thereof, if desired.

The pH of a color developer is preferably not higher than 12, more preferably is from 9 to 12, and most preferably is from 9.5 to 11.5.

After color development, photographic emulsion layers are generally subjected to a bleach processing. The bleach processing may be carried out simultaneously with a fixation processing (a bleach-fix processing), or separately therefrom. For the purpose of reducing the photographic processing time, the bleach processing may be followed by the bleach-fix processing. Also, the processing may be performed with two successive bleach-fix baths, or the fixation processing may be followed by the bleach-fix processing, or the bleach-fix processing may be followed by the bleach processing if desired. Examples of bleaching agents which can be used include compounds of polyvalent metals, such as Fe(III), Co(III), Cr(VI), Cu(II); peracids; quinones; and nitro compounds. More specifically, ferricyanides; dichromates; organic complex salts formed by Fe(III) or Co(III), and aminopolycarboxylic acids, such as ethylene-diaminetetraacetic acid, diethylenetriaminepentaacetic acid, cyclohexanediaminetetraacetic acid, methylimino-diacetic acid, 1,3-diaminopropanetetraacetic acid, glycol ether diamine tetraacetic acid, citric acid, tartaric acid, malic acid; persulfates; hydrobromides; permanganates; and nitrobenzenes; can be used as bleaching agents. Of these bleaching agents, aminopolycarboxylic acid-Fe(III) complex salts including (ethylenediaminetetra-acetato)iron(III) complex, and persulfates are preferred for rapid processing and prevention of environmental pollution. In particular, aminopolycarboxylic acid-Fe(III) complex salts are useful in both a bleaching bath and bleach-fix bath. The pH of the bleaching or bleach-fix bath which uses an aminopolycarboxylic acid-Fe(III) complex salt generally ranges from 5.5 to 8, but the processing can be performed under a lower pH for the purpose of increasing the processing speed.

In the bleaching bath, the bleach-fix bath and their prebaths, a bleach accelerator can be used, if desired. Specific examples of useful bleach accelerators include compounds containing a mercapto group or a disulfido linkage, as disclosed in U.S. Pat. No. 3,893,858, West German Patent 1,290,812, JP-A-53-95630, *Research Disclosure,* No. 17129 (Jul. 1978), and so on; the thiazolidine derivatives disclosed in JP-A-50-140129; the urea derivatives disclosed in U.S. Pat. No. 3,706,561; the iodides disclosed in JP-A-58-16235; the polyoxyethylene compounds disclosed in West German Patent 2,748,430; the polyamine compounds disclosed in JP-B-45-8836; bromide ion; and so on. Of these compounds, the compounds containing a mercapto group or a disulfido linkage are preferred over others because of their great accelerating effects. In particular, the compounds disclosed in U.S. Pat. No. 3,893,858, West German Patent 1,290,812 and JP-A-53-95630 are advantageous. The compounds disclosed in U.S. Pat. No. 4,552,835 are also preferred. These bleach accelerators may be incorporated in a sensitive material. In case of the bleach-fix processing of color photographic materials for photograph-taking, these bleach accelerators can produce a particularly great effect.

Examples of fixing agents which can be used include thiosulfates, thiocyanates, thioether compounds, thioureas and a large amount of iodide. Of these fixing agents, generally used ones are thiosulfates, especially ammonium thiosulfate. As for the preservatives for a bleach-fix bath, sulfites, bisulfites or adducts of carbonyl compounds and bisulfite are preferably used.

After a desilvering step, the silver halide color photographic material of the present invention is typically subjected to a step of washing with water and/or a stabilizing step. The volume of washing water required can be determined variously depending on the characteristics of photographic materials to be processed (e.g., on what kinds of couplers are incorporated therein), the end-use purposes of photographic materials to be processed, the temperature of washing water, the number of washing tanks (stage number), the way of replenishing washing water (e.g., co-current or counter-current), and other various conditions. Of these conditions, the relation between the number of washing tanks and the volume of washing water in the multistage counter current process can be determined according to the methods described in *Journal of the Society of Motion Picture and Television Engineers,* volume 64, pages 248–254 (May 1955).

According to the multistage counter current process described in the above-cited article, the volume of washing water can be sharply decreased. However, the process has disadvantages, e.g., in that bacteria propagate in the tanks because of an increase in staying time of water in the tanks, and suspended matter produced from the bacteria adheres photographic materials processed therein. In the processing of the color photosensitive material of the present invention, the method of reducing the contents of calcium and magnesium, which is disclosed in JP-A-62-288838, can be employed to great advantage for solving this problem. Further, bactericides such as isothiazolone compounds disclosed in JP-A-57-8542, chlorine-containing germicides such as sodium salt of chlorinated isocyanuric acid, and benzotriazoles, as described in Hiroshi Horiguchi *Bohkin Bohbai Zai no Kaqaku* (which means "Chemistry of Antibacteria and Antimolds"), *Biseibutsu no Mekkin Sakkin Bohbai Gijutsu* (which means "Arts of Sterilizing and Pasteurizing Microbe, and Mold Proofing"), compiled by Eisei Gijutsu Kai, and *Bohkin- and Bohbai-zai Jiten* (which means "Thesaurus of Antibacteria and Antimolds"), compiled by Nippon Bohkin Bohbai Gakkai.

Washing water to be used in the processing of the photographic material of the present invention is generally adjusted to pH 4–9, preferably to pH 5–8. The washing temperature and washing time, can be varied depending on the characteristics and the intended use of the photosensitive material to be washed, but are generally in the range of 20 sec. to 10 min. at 15° C.–45° C., preferably 30 sec. to 5 min. at 25° C.–40° C.

Also, the photographic material of the present invention can be processed directly with a stabilizing solution in place of using the above-described washing water. All conventional methods which are described in JP-A-57-8543, JP-A-58-14834 and JP-A-60-220345, can be applied to the stabilization processing in the present invention.

To the stabilizing bath various kinds of chelating agents and antimolds can be added.

The washing water and/or the stabilizing solution overflowing the processing baths with the replenishing thereof can also be reused in other steps, such as the desilvering step.

For the purposes of simplification and speed up of a photographic processing of the silver halide photographic material to be used in the present invention, a color developing agent may be incorporated thereinto. It is preferred that the color developing agent be used in the form of precursors of various types, including compounds of an indoaniline compound described in U.S. Pat. No. 3,342,599, compounds of a Schiff base type described in U.S. Pat. No. 3,342,599 and *Research Disclosure,* Nos. 14850 and 15159, aldol compounds described in Id., No. 13924, metal complex salts described in U.S. Pat. No. 3,719,492, and urethane compounds described in JP-A-53-135628.

In the silver halide photographic material to be used in the present invention, various 1-phenyl-3-pyrazolidones may be incorporated for the purpose of accelerating color development. Typical examples of such compounds are described in JP-A-56-64339, JP-A-57-144547 and JP-A-115438.

The temperature of each processing bath used in the present invention ranges from 10° C to 50° C. Though a standard temperature is within the range of 33° C. to 38° C., temperatures higher than this can be adopted to reduce processing time through acceleration of the processing, while those lower than this permit improved image quality and enhanced stability of the processing bath. Moreover, processing utilizing a cobalt or hydrogen peroxide intensification method as described in West German Patent 2,226,770 or U.S. Pat. No. 3,674,499 may be carried out for the purpose of saving silver.

It is desirable that the replenisher in each processing step should be used in a small amount rather than large one. A preferred replenishing amount is 0.1 to 50 times, particularly 3 to 30 times the amount of the processing solution brought from the prebath per unit area of the photographic material to be processed.

For development of a black and white photographic material in the present invention, various known developing agents can be employed. Specifically, polyhydroxybenzenes, such as hydroquinone, 2-chlorohydroquinone, 2-methylhydroquinone, catechol, pyrogallol; aminophenols, such as p-aminophenol, N-methyl-p-aminophenol, 2,4-dimethyl-amino-phenol; 3-pyrazolidones, such as 1-phenyl-3-pyrazolidone, 1-phenyl-4,4'-dimethyl-3-pyrazolidone, 1-phenyl-4-methyl-4-hydroxymethyl-3-pyrazolidone, 5,5-di-methyl-1-phenyl-3-pyrazolidone; and ascorbic acids can be used independently or in a combination of two or more thereof. Also, the developers described in JP-A-58-55928 can be employed.

Specific examples of developers, preservatives, buffers and developing methods which can be employed for a black and white photographic material, and their usages are described in *Research Disclosure,* No. 17643, Item XIX–XXI (Dec, 1978).

The present invention will now be illustrated in greater detail by reference to the following specific examples. However, the invention is not to be construed as being limited to these examples.

Unless otherwise indicated, all parts, percents and ratios are by weight.

EXAMPLE 1

The following first to fourteenth layers were coated on the surface side of a paper support laminated with a polyethylene film on both sides thereof, and further fifteenth and sixteenth layers described below were coated on the back side of the paper support to prepare a multilayer color photographic light-sensitive material. The polyethylene film laminated on the first layer side contained titanium white as a white pigment and a trace amount of ultramarine blue as a bluish dye.

The ingredients used and their coverages, expressed in terms of $g/m^2$, are described below, and each coverage amount of silver halide is represented on a silver basis. Emulsions used for their respective color-sensitive layers were prepared according to the preparation method of the emulsion EM1. However, the emulsion used for the fourteenth layer was a Lippman emulsion whose grain surface had not been chemically sensitized.

| | |
|---|---|
| First Layer (Antihalation layer): | |
| Black colloidal silver | 0.10 |
| Gelatin | 1.30 |
| Second Layer (Interlayer): | |
| Gelatin | 0.70 |
| Third Layer (Slow red-sensitive layer): | |
| Silver bromide (having an average grain size of 0.3 μm, a variation coefficient of 8% in size distribution, and an octahedral crystal form) sensitized spectrally with red sensitizing dyes (ExS-1, ExS-2 and ExS-3) | 0.06 |
| Silver chlorobromide (having silver chloride content of 5 mol %, an average grain size of 0.45 μm, a variation coefficient of 10% in size distribution, and an octahedral crystal form) sensitized spectrally with red sensitizing dyes (ExS-1, ExS-2 and ExS-3) | 0.10 |
| Gelatin | 1.00 |
| Cyan coupler (ExC-1) | 0.11 |
| Cyan coupler (ExC-2) | 0.10 |
| Discoloration inhibitor (equiweight mixture of Cpd-2, Cpd-3, Cpd-4 and Cpd-13) | 0.12 |
| Coupler dispersion medium (Cpd-5) | 0.03 |
| Coupler solvent (equiweight mixture of Solv-7, Solv-2 and Solv-3) | 0.06 |
| Fourth Layer (High-speed red-sensitive layer) | |
| Silver bromide (having an average grain size of 0.60 μm, a variation coefficient of 15% in size distribution, and an octahedral crystal form) sensitized spectrally with red sensitizing dyes (ExS-1, ExS-2 and ExS-3) | 0.14 |
| Gelatin | 1.00 |
| Cyan coupler (ExC-1) | 0.15 |
| Cyan coupler (ExC-2) | 0.15 |
| Discoloration inhibitor (equiweight mixture of Cpd-2, Cpd-3, Cpd-4 and Cpd-13) | 0.15 |
| Coupler dispersion medium (Cpd-5) | 0.03 |
| Coupler solvent (equiweight mixture of Solv-7, Solv-2 and Solv-3) | 0.10 |
| Fifth Layer (Interlayer) | |
| Gelatin | 1.00 |
| Color stain inhibitor (Cpd-7) | 0.08 |
| Color stain inhibitor solvent (equiweight mixture of Solv-4 and Solv-5) | 0.16 |
| Polymer latex (Cpd-8) (solid content: the same hereinafter) | 0.10 |
| Sixth Layer (Slow green-sensitive layer) | |
| Silver bromide (having an average grain size of 0.25 μm, a variation coefficient of 8% in size distribution, and an octahedral crystal form) sensitized spectrally with green sensitizing dye (ExS-3) | 0.04 |
| Silver bromide (having an average grain size of 0.45 μm, a variation coefficient of 11% in size distribution, and an octahedral crystal form) sensitized spectrally with green sensitizing dyes (ExS-3 and ExS-4) | 0.06 |
| Gelatin | 0.80 |
| Magenta coupler (equiweight mixture of ExM-1 and ExM-2) | 0.11 |
| Discoloration inhibitor (Cpd-9) | 0.10 |

-continued

| | |
|---|---|
| Stain inhibitor (equiweight mixture of Cpd-10 and Cpd-22) | 0.014 |
| Stain inhibitor (Cpd-23) | 0.001 |
| Stain inhibitor (Cpd-12) | 0.01 |
| Coupler dispersion medium (Cpd-5) | 0.05 |
| Coupler solvent (equiweight mixture of Solv-4 and Solv-6) | 0.15 |
| Seventh Layer (High-speed green-sensitive layer) | |
| Silver bromide (having an average grain size of 0.8 μm, a variation coefficient of 16% in size distribution, and an octahedral crystal form) sensitized with green sensitizing dyes (ExS-3 and ExS-4) | 0.10 |
| Gelatin | 0.80 |
| Magenta coupler (ExM-1 and ExM-2) | 0.11 |
| Discoloration inhibitor (Cpd-9) | 0.10 |
| Stain inhibitor (equiweight mixture of Cpd-10 and Cpd-22) | 0.013 |
| Stain inhibitor (Cpd-23) | 0.001 |
| Stain inhibitor (Cpd-12) | 0.01 |
| Coupler dispersion medium (Cpd-5) | 0.05 |
| Coupler solvent (equiweight mixture of Solv-4 and Solv-6) | 0.15 |
| Eighth Layer (Interlayer) | |
| The same as the fifth layer | |
| Ninth Layer (Yellow filter layer) | |
| Yellow colloidal silver | 0.20 |
| Gelatin | 1.00 |
| Color stain inhibitor (Cpd-7) | 0.06 |
| Color stain inhibitor solvent (equiweight mixture of Solv-4 and Solv-5) | 0.15 |
| Polymer latex (Cpd-8) | 0.10 |
| Tenth Layer (Interlayer) | |
| The same as the fifth layer | |
| Eleventh Layer (Slow blue-sensitive layer) | |
| Silver bromide (having an average grain size of 0.45 μm, a variation coefficient of 8% in size distribution, and an octahedral crystal form) sensitized spectrally with blue sensitizing dyes (ExS-5 and ExS-6) | 0.07 |
| Silver bromide (having an average grain size of 0.60 μm, a variation coefficient of 14% in size distribution, and an octahedral crystal form) sensitized spectrally with blue sensitizing dyes (ExS-5 and ExS-6) | 0.10 |
| Gelatin | 0.50 |
| Yellow coupler (ExY-1) | 0.22 |
| Stain inhibitor (Cpd-11) | 0.001 |
| Discoloration inhibitor (Cpd-6) | 0.10 |
| Coupler dispersion medium (Cpd-5) | 0.05 |
| Coupler solvent (Solv-2) | 0.05 |
| Twelfth Layer (High-speed blue-sensitive layer) | |
| Silver bromide (having an average grain size of 1.2 μm, a variation coefficient of 21% in size distribution, and an octahedral crystal form) sensitized spectrally with blue sensitizing dyes (ExS-5 and ExS-6) | 0.25 |
| Gelatin | 1.00 |
| Yellow coupler (ExY-1) | 0.41 |
| Stain inhibitor (Cpd-11) | 0.002 |
| Discoloration inhibitor (Cpd-6) | 0.10 |
| Coupler dispersion medium (Cpd-5) | 0.05 |
| Coupler solvent (Solv-2) | 0.10 |
| Thirteenth Layer (Ultraviolet absorbing layer) | |
| Gelatin | 1.50 |
| Ultraviolet absorbent (equiweight mixture of Cpd-1, Cpd-3 and Cpd-13) | 1.00 |
| Stain inhibitor (equiweight mixture of Cpd-6 and Cpd-14) | 0.06 |
| Dispersion medium (Cpd-5) | 0.05 |
| Ultraviolet absorbent solvent (equiweight mixture of Solv-1 and Solv-2) | 0.15 |
| Irradiation preventing dye (equiweight mixture of Cpd-15 and Cpd-16) | 0.02 |
| Irradiation preventing dye (equiweight mixture of Cpd-17 and Cpd-18) | 0.02 |

-continued

| | |
|---|---|
| Fourteenth Layer (Protective layer) | |
| Fine-grained silver chlorobromide (having silver chloride content of 97 mol % and an average grain size of 0.2 μm) | 0.05 |
| Acryl denatured copolymer of polyvinyl alcohol (denatured degree: 17%) | 0.02 |
| Equiweight mixture of polymethylmethacrylate particles (average particle size: 2.4 microns) and silicon oxide (average grain size: 5 μm) | 0.05 |
| Gelatin | 1.50 |
| Gelatin hardener (H-1) | 0.17 |
| Fifteenth Layer (Backing layer) | |
| Gelatin | 2.50 |
| Sixteenth Layer (Back protecting layer) | |
| Equiweight mixture of polymethylmethacrylate particles (average particle size: 2.4 microns) and silicon oxide (average grain size: 5 μm) | 0.05 |
| Gelatin | 2.00 |
| Gelatin Hardener (H-1) | 0.11 |

Preparation of Emulsion EM1:

An aqueous solution of potassium bromide (0.15N) and that of silver nitrate (0.15N) were simultaneously added at 75° C. over a 15-minute period to a 1 wt.% aqueous solution of gelatin with vigorous stirring to produce octahedral silver bromide grains having an average grain size of 0.40 μm. The resulting emulsion was chemically sensitized by adding thereto, in sequence, 3,4-di-methyl-1,3-thiazoline-2-thione, sodium thiosulfate and chloroauric acid (tetrahydrate) in amounts of 0.3 g, 6 mg and 7 mg, respectively, per mole of silver, and then by heating it at 75° C. for 80 minutes. The thus obtained grains were employed as core grains, and thereon silver bromide was further grown under the same circumstances as the first precipitation had been performed, resulting in preparation of an octahedral monodisperse core/shell type silver bromide emulsion having the final average size of 0.7 μm. The variation coefficient of the grain sizes was about 10%. This emulsion was chemically sensitized by adding thereto 1.5 mg/mol-Ag of sodium thiosulfate and 1.5 mg/mol-Ag of chloroauric acid (tetrahydrate), and then heating it at 60° C. for 60 minutes to prepare an internal latent-image type silver halide emulsion.

In each light-sensitive layer of Sample Nos. 1 to 8 and Sample Nos. 9 to 16, a nucleating agent ExZK was added in an amount of $3.6\times10^{-6}$ mol/mol-Ag and $4.5\times10^{-6}$ mol/mol-Ag, respectively, and a nucleation accelerator set forth in Table 1 was used in the prescribed amount. To each layer were further added alkanol XC (Dupont Co.) and sodium alkylbenzenesulfonate as emulsifying dispersion aid, and succinic acid ester and Magefac F-120 (Dai-Nippon Ink & Chemicals, Inc.) as coating aid. Each silver halide- and colloidal silver-containing layer contained a mixture of Cpd-19, Cpd-20 and Cpd-21 as a stabilizer.

ExS-1

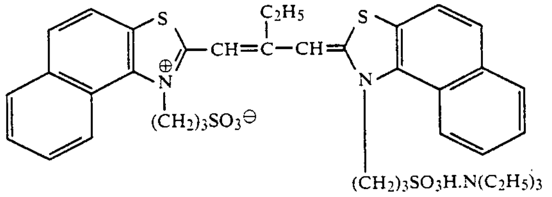

ExS-2

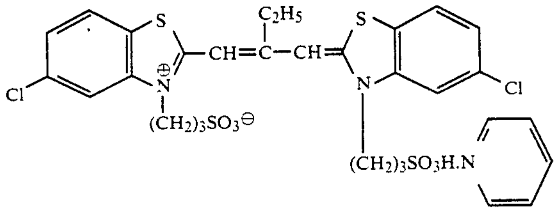

ExS-3

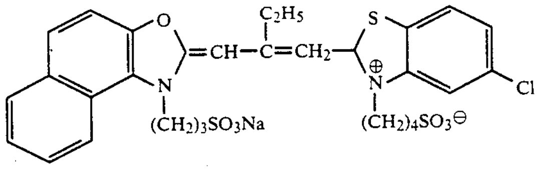

ExS-4

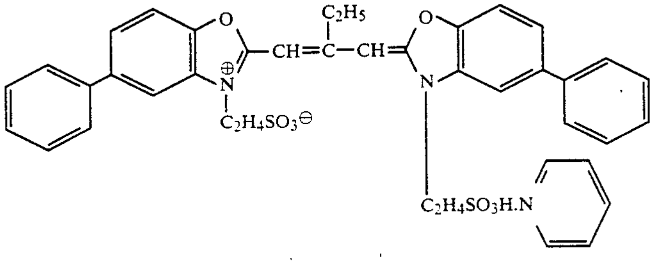

-continued
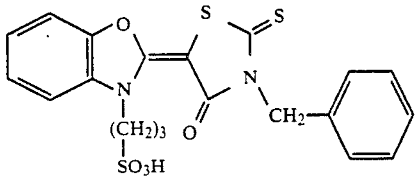
ExS-5
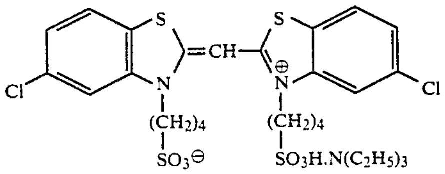
ExS-6
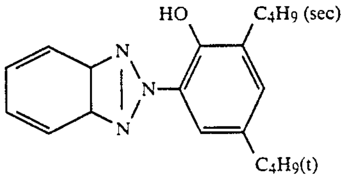
Cpd-1
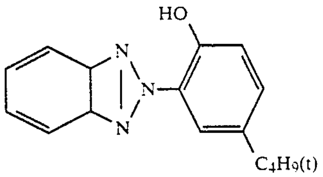
Cpd-2
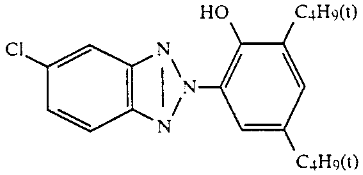
Cpd-3
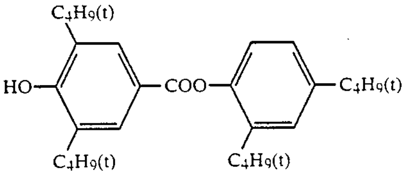
Cpd-4
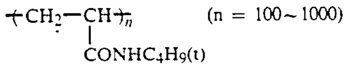
Cpd-5
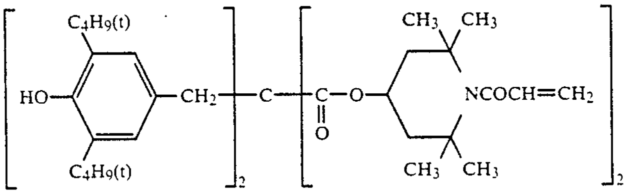
Cpd-6
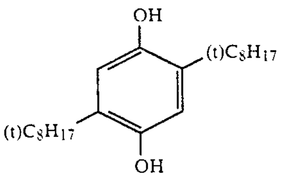
Cpd-7
Polyethylacrylate (particles having 0.02μ diameter)
Cpd-8

-continued
Cpd-9
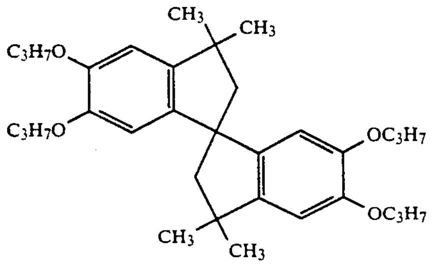
Cpd-10
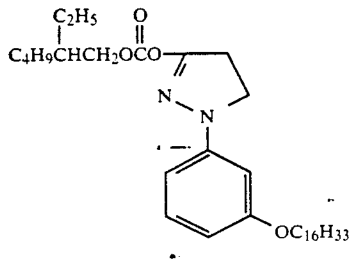
Cpd-11
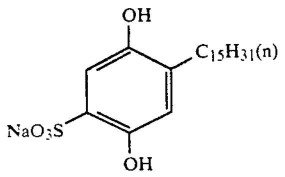
Cpd-12
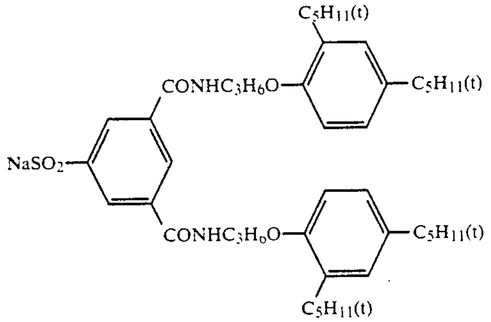
Cpd-13
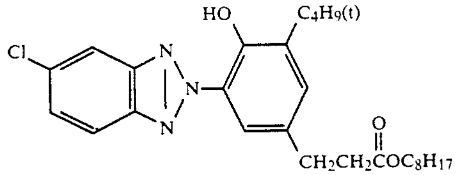
Cpd-14
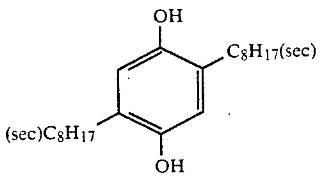
Cpd-15
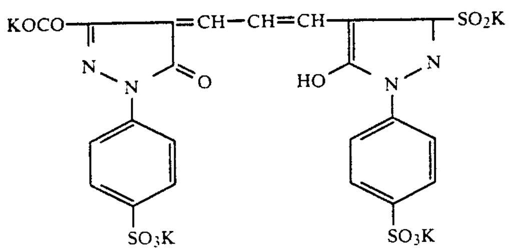

-continued
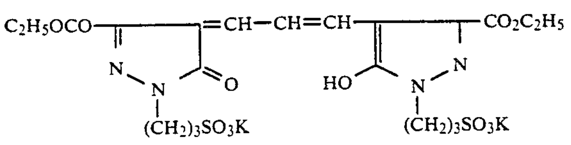
Cpd-16
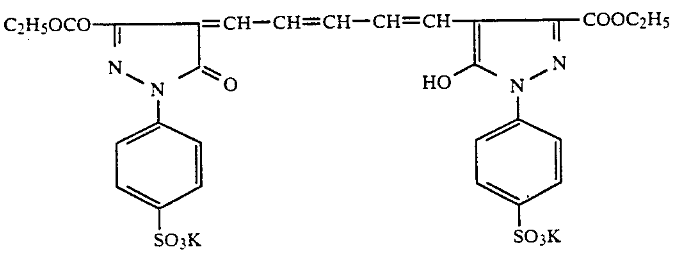
Cpd-17
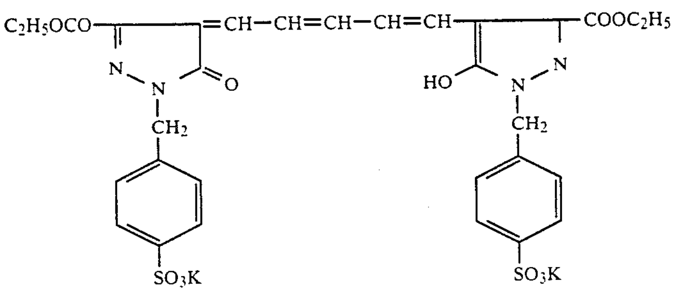
Cpd-18
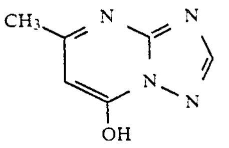
Cpd-19
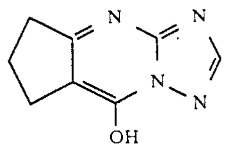
Cpd-20
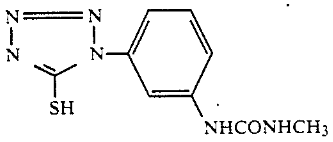
Cpd-21
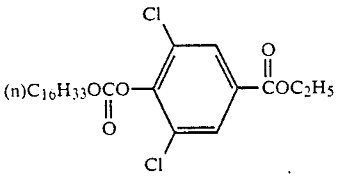
Cpd-22
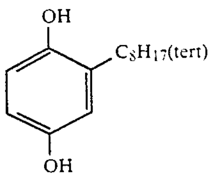
Cpd-23

-continued
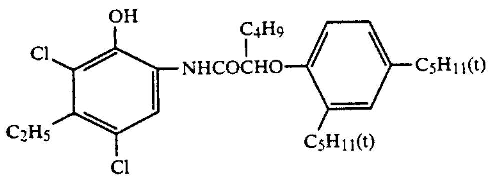
EXC-1
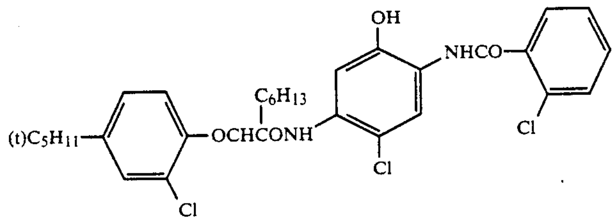
EXC-2
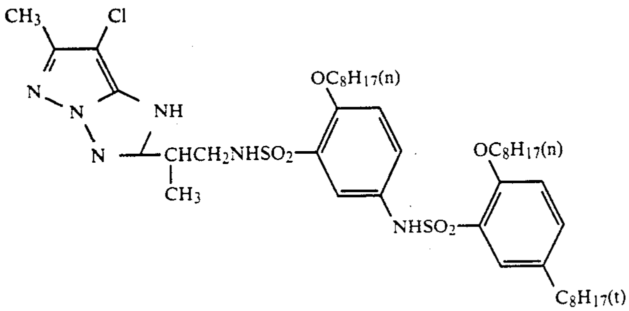
EXM-1
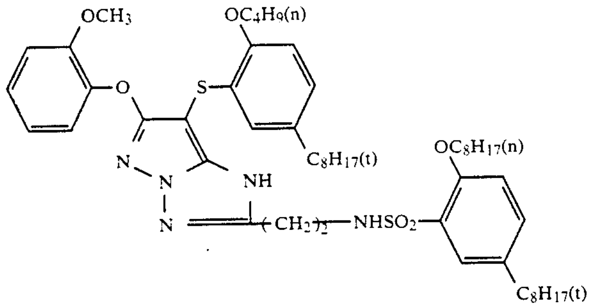
EXM-2
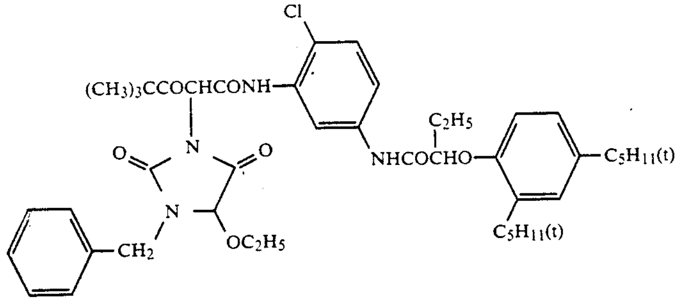
ExY-1
| | |
|---|---|
| Di(2-ethylhexyl)phthalate | Solv-1 |
| Trinonyl phosphate | Solv-2 |
| Di(3-methylhexyl)phthalate | Solv-3 |
| Tricresyl phosphate | Solv-4 |
| Dibutyl phthalate | Solv-5 |
| Trioctyl phosphate | Solv-6 |
| Di(2-ethylhexyl)sebacate | Solv-7 |
| 1,2-bis(vinylsulfonylacetamido)ethane | H-1 |

-continued

7-[3-(5-mercaptotetrazole-1-yl)benzamido]-10-propargyl-1,2,3,4-tetrahydroacridinium-perchlorate ExZK-1

The thus prepared color photographic paper was wedgewise exposed (3200° K., 0.1 sec., 100 CMS), and then subjected to photographic processing in accordance with the following process A. Magenta color densities of the developed images were measured. The results obtained are shown in Table 1.

| | Process A Time | Temperature |
|---|---|---|
| Color Development | 90 Sec. | 38° C. |
| Bleach-Fix | 40 sec. | 33° C. |
| Washing (1) | 40 sec. | 33° C. |
| Washing (2) | 40 sec. | 33° C. |
| Washing (3) | 15 sec. | 33° C. |
| Drying | 30 sec. | 80° C. |

The replenishment of washing water was performed by a counter current replenishing process, wherein the washing bath (3) was replenished with washing solution, and the solution overflowing the washing bath (3) was introduced into the washing bath (2), and the solution overflowing the washing bath (2) was introduced into the washing bath (1).

In this case, the amount of the blix solution carried from the blix bath to wash bath (1) by the light-sensitive material was 35 ml/m$^2$ and the replenishing amount of wash water was 9.1 times the carrying amount of the blix solution.

The compositions of the processing solutions were as follows.

| | Mother Liquor |
|---|---|
| Color Developer | |
| Ethylenediaminetetraqismethylene-phosphonic Acid | 0.5 g |
| Diethylene Glycol | 10 ml |
| Benzyl Alcohol | 12.0 ml |
| Potassium Bromide | 0.65 g |
| Sodium Sulfite | 2.4 g |
| N,N-Diethylhydroxylamine | 4.0 g |
| Triethylenediamine(1,4-diaza-bicyclo[2.2.2]octane) | 4.0 g |
| N-Ethyl-N-(β-methanesulfonamido-ethyl)-3-methylaniline Sulfate | 5.6 g |
| Potassium Carbonate | 27.0 g |
| Fluorescent Whitening Agent (diamino-stilbene series) | 1.0 g |
| Water to make | 1000 ml |
| pH (25° C.) | 10.50 |
| Blix Solution | |
| Ethylenediaminetetraacetic Acid. Di-Sodium.Di-Hydrate | 4.0 g |
| Ethylenediaminetetraacetic Acid. Fe(III).Ammonium.Di-Hydrate | 46.0 g |
| Ammonium Thiosulfate (700 g/liter) | 155 ml |
| Sodium p-Toluenesulfinate | 20.0 g |
| Sodium Hydrogensulfite | 12.0 g |

-continued

| | Mother Liquor |
|---|---|
| Ammonium Bromide | 50.0 g |
| Ammonium Nitrate | 30.0 g |
| Water to make | 1000 ml |
| pH (25° C.) | 6.20 |

Wash Water

City water was passed through a mixed bed type column filled with a H-type strong acid cation exchange resin (Amberlite IR-120B, trade name, made by Rhom & Haas Co.) and an OH type anion exchange resin (Amberlite IR-400) to reduce the concentration of calcium and magnesium ions less than 3 mg/liter and 20 mg/liter of sodium dichloroisocyanurate and 1.5 g/liter of sodium sulfate were added thereto. The pH of the solution was in the range of from 6.5 to 7.5.

TABLE 1

| Sample No. | Nucleation Accelerator | Dmax | Dmin |
|---|---|---|---|
| 1 | A - 1(*) | 2.3 | 0.15 |
| 2 | A - 2(*) | 2.4 | 0.16 |
| 3 | A - 3(*) | 2.3 | 0.15 |
| 4 | A - 6(*) | 2.3 | 0.16 |
| 5 | A - 13(*) | 2.4 | 0.16 |
| 6 | A - 15(*) | 2.3 | 0.16 |
| 7 | A - 17(*) | 2.4 | 0.16 |
| (Comparison) 8 | — | 1.9 | 0.21 |
| 9 | B-1(**) | 2.3 | 0.16 |
| 10 | B-5(**) | 2.2 | 0.16 |
| 11 | B-9(**) | 2.2 | 0.17 |
| 12 | B-12(**) | 2.3 | 0.16 |
| 13 | B-22(**) | 2.3 | 0.16 |
| 14 | B-24(**) | 2.1 | 0.16 |
| 15 | B-27(**) | 2.1 | 0.16 |
| (Comparison) 16 | — | 1.8 | 0.21 |

(*): Addition amount: 5.8 × $10^{-4}$ mol/mol-Ag
(**): Addition amount: 3.2 × $10^{-4}$ mol/mol-Ag The Sample Nos. 1 to 7 and 9 to 15 using the nucleation accelerators of this invention showed preferably high Dmax and low Dmin as compared to Comparison Sample Nos. 8 and 16.

As to the cyan and yellow image densities, almost same results were obtained

EXAMPLE 2

By following the same procedure as Example 1 except that 2.6×$10^{-5}$ mol/mol-Ag or 4.2×$10^{-5}$ mol/-mol-Ag of the following nucleating agent was used, respectively for each emulsion layer, almost same results were obtained.

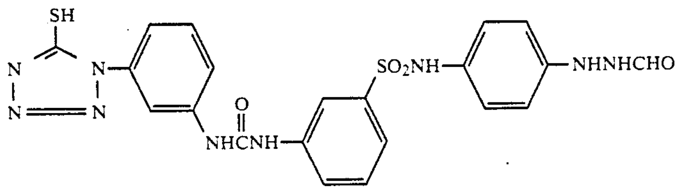

| | Processing Step B Time | Temperature |
|---|---|---|

-continued

| | | |
|---|---|---|
| Color Development*[1] | 135 sec. | 36° C. |
| Blix | 40 sec. | 36° C. |
| Stabilization (1) | 40 sec. | 36° C. |
| Stabilization (2) | 40 sec. | 36° C. |
| Drying | 40 sec. | 70° C. |

| | Mother Liquor |
|---|---|
| Color Development | |
| Hydroxyethyliminodiacetic Acid | 0.5 g |
| β-Cyclodextrin | 1.5 g |
| Monoethylene Glycol | 9.0 g |
| Benzyl Alcohol | 9.0 g |
| Mono-ethanolamine | 2.5 g |
| Sodium Bromide | 2.3 g |
| Sodium Chloride | 5.5 g |
| N,N-Diethylhydroxylamine | 5.9 g |
| 3-Methyl-4-amino-N-ethyl-N-(β-methane-sulfonamidoethyl)-aniline Sulfate | 2.7 g |
| 3-Methyl-4-amino-N-ethyl-(β-hydroxy-ethyl)-aniline Sulfate | 4.5 g |
| Potassium Carbonate | 30.0 g |
| Fluorescent Whitening Agent (stilbene series) | 1.0 g |
| Pure water to make | 1000 ml |
| pH | 10.30 |
| pH was adjusted by potassium hydroxide or hydrochloric acid. | |
| Blix Solution | |
| Ammonium Thiosulfate | 110 g |
| Sodium Hydrogensulfite | 12 g |
| Diethylenetriaminepentaacetic Acid Iron(III) Ammonium | 80 g |
| Diethylenetriaminepentaacetic Acid | 5 g |
| 2-Mercapto-5-amino-1,3,4-thiadiazole | 0.3 g |
| Pure water to make | 1000 ml |
| pH | 6.80 |
| pH was adjusted with aqueous ammonia or hydrochloric acid. | |
| Stabilizer | |
| 1-Hydroxyethylidene-1,1-diphosphonic Acid | 2.7 g |
| o-Phenylphenol | 0.2 g |
| Potassium Chloride | 2.5 g |
| Bismuth Chloride | 1.0 g |
| Zinc Chloride | 0.25 g |
| Sodium Sulfite | 0.3 g |
| Ammonium Sulfate | 4.5 g |
| Fluorescent whitening Agent (stilbene series) | 0.5 g |
| Pure water to make | 1000 ml |
| pH | 7.2 |
| pH was adjusted with potassium hydroxide or hydrochloric acid. | |

*[1]After immersing in color developer for 15 seconds, the light-sensitive material was color developed while light-fogging it by white light of 1 lux for 15 seconds.

EXAMPLE 3

By following the same procedure as Example 1 except that the nucleating agent was omitted, a color photographic material was prepared. After applying thereto an imagewise exposure as in Example 1, the light-sensitive material was processed by Processing Step B. The result obtained was almost same as in Example 1.

EXAMPLE 4

By following the same procedure as Example 1 except that Processing Step C shown below was employed, almost the same result as Example 1 was obtained.

| | Processing Step C | |
|---|---|---|
| | Time | Temperature |
| Color Development | 70 sec. | 38° C. |

-continued

| | Processing Step C | |
|---|---|---|
| | Time | Temperature |
| Blix | 30 sec. | 38° C. |
| Wash (1) | 30 sec. | 38° C. |
| Wash (2) | 30 sec. | 38° C. |

In this case, the amount of the replenishing amount of wash water was 8.6 times the carrying amount of the blix solution to wash bath (1).

| | Mother Liquor |
|---|---|
| Color Developer | |
| Diethylenetriaminepentaacetic Acid | 0.5 g |
| 1-Hydroxyethylidene-1,1-diphosphonic Acid | 0.5 g |
| Diethylene Glycol | 8.0 g |
| Benzyl Alcohol | 9.0 g |
| Sodium Bromide | 0.7 g |
| Sodium Chloride | 0.5 g |
| Sodium Sulfite | 2.0 g |
| Hydroxylamine Sulfate | 2.8 g |
| 3-Methyl-4-amino-N-ethyl-N-(β-methane-sulfonamidoethyl)-aniline Sulfate | 2.0 g |
| 3-Methyl-4-amio-N-ethyl-N-(β-hydroxy-ethyl)-aniline Sulfate | 4.0 g |
| Potassium Carbonate | 30.0 g |
| Fluorescent Whitening Agent (stilbene series) | 1.0 g |
| Pure water to make | 1000 ml |
| pH | 10.50 |
| pH was adjusted with potassium hydroxide or hydrochloric acid. | |
| Blix Solution | |
| Ammonium Thiosulfate | 77 g |
| Sodium Hydrogensulfite | 14.0 |
| Ethylenediaminetetraacetic Acid Fe(III) Ammonium.Di-hydrate | 40.0 g |
| Ethylenediaminetetraacetic Di-Sodium. di-hydrate | 4.0 g |
| 2-Mercapto-1,3,4-triazole | 0.5 g |
| Pure water to make | 1000 ml |
| pH | 7.0 |
| pH was adjusted with aqueous ammonia or hydrochloric acid. | |

Wash Water

Pure water was used (it was also used in the mother liquors and replenishers).

EXAMPLE 5

After adding a panchromatic sensitizing dye, 3,3'-diethyl-9-methylthiacarbocyanine to the aforesaid Emulsion EM1 in an amount of 5 mg per mol of silver halide, $3.5\times10^{-5}$ mol per mol of silver halide (Sample Nos. 1 to 5) or $1.4\times10^{-5}$ mol per mol of silver halide (Sample Nos. 6 to 10) of a nucleating agent, 1-formyl-2-{4-[3-(5-mercaptotetrazol-lyl)benzamido]phenyl}-hydrazine and the nucleation accelerator shown in Table 2 below were added to the emulsion, and the resultant emulsion was coated on a polyethylene terephthalate support at a silver coverage of 2.8 g/m$^2$. In this case, a protective layer composed of gelatin and a hardening agent was simultaneously formed on the emulsion layer. Thus, direct positive photographic materials (Sample Nos. 1 to 5) having sensitivity upto red light were prepared.

Each of the samples prepared was exposed for 0.1 second by a 1 KW tungsten lamp (color temperature 2854° K.) sensitometer through a step wedge, developed by an automatic processor (Kodak Proster I Processor) using a developer, Kodak proster Plus Processing Solution (pH 10.7) for 18 seconds at 38° C., washed, fixed, washed, and dried.

Then, the maximum density (Dmax) and the minimum density (Dmin) of the direct positive image of each sample thus obtained were measured. The results are shown in Table 2.

TABLE 2

| Sample No. | Nucleation Accelerator | Dmax | Dmin |
|---|---|---|---|
| 1 | A - 4(*) | 2.37 | 0.05 |
| 2 | A - 12(*) | 2.38 | 0.05 |
| 3 | A - 16(*) | 2.32 | 0.05 |
| 4 | A - 20(*) | 2.35 | 0.05 |
| (Comparative) 5 | — | 2.05 | 0.06 |
| 6 | B - 1(**) | 2.36 | 0.05 |
| 7 | B - 9(**) | 2.34 | 0.05 |
| 8 | B - 12(**) | 2.29 | 0.05 |
| 9 | B - 17(**) | 2.27 | 0.05 |
| (Comparative) 10 | — | 2.08 | 0.06 |

(*): Addition amount: 1.8 × $10^{-4}$ mol/mol-Ag
(**): Addition amount: 4.5 × $10^{-4}$ mol/mol-Ag Sample Nos. 1 to 4 and Sample Nos. 6 to 9 using the nucleation accelerators of this invention preferably showed high Dmax and low Dmin as compared with Comparison Sample Nos. 5 and 10.

As described above, it can be seen that according to the image-forming process of this invention, direct positive images having the sufficiently high maximum image density and sufficiently low minimum image density are obtained. These effects can be obtained satbly regardless of variation of treating conditions and thus the process is advantageous for practical use.

While the invention has been described in detail and with reference to specific embodiments thereof, it will be apparent to one skilled in the art that various changes and modifications can be made therein without departing from the spirit and scope thereof.

What is claimed is:

1. A method for forming a direct positive image, which comprises imagewise exposing a photographic light-sensitive material comprising a support having thereon at least one photographic emulsion layer containing unprefogged internal latent image-type silver halide grains and developing the photographic light-sensitive material after or during fogging to form a direct positive image, wherein the aforesaid development is performed at a pH of from 9 to 12 and in the presence of at least one compound selected from the group consisting of compounds represented by formulae (I), (II), (III), (IV), (V) or (VI), acid salts of the compounds represented by formulae (I) to (IV) provided that the substituents thereof contain an amino group, and acid salts of the compounds represented by formulae (V) or (VI);

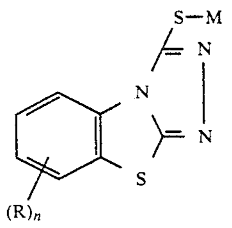
(I)

-continued

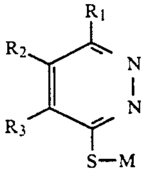
(II)

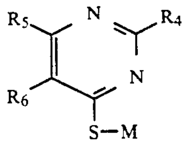
(III)

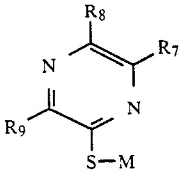
(IV)

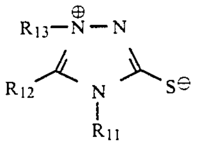
(V)

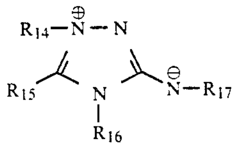
(VI)

wherein M represents a hydrogen atom, an alkali metal atom, an ammonium group, or a group cleaving under an alkaline condition; R represents a group capable of substituting a hydrogen atom; n represents zero or an integer from 1 to 4; and $R_1$, $R_2$, $R_3$, $R_4$, $R_5$, $R_6$, $R_7$, $R_8$, and $R_9$ each represents a hydrogen atom, —SM' (M' has the same meaning as M), a substituted or unsubstituted alkyl group, a substituted or unsubstituted aryl group, a substituted or unsubstituted alkenyl group, a substituted or unsubstituted aralkyl group, a substituted or unsubstituted alkylthio group, a substituted or unsubstituted carbonamido group, a substituted or unsubstituted sulfonamido group, a substituted unsubstituted ureido group, a substituted or unsubstituted thioureido group, a substituted or unsubstituted alkyl or aryl oxycarbonylamino group, or a substituted or unsubstituted amino group; the heterocyclic ring of aforesaid formulae (II), (III) or (IV) may be further condensed with a carbon aromatic ring; $R_{11}$, $R_{12}$, $R_{13}$, $R_{14}$, $R_{15}$, $R_{16}$, and $R_{17}$ each represents a substituted or unsubstituted alkyl group, a substituted or unsubstituted alkenyl group, a substituted or unsubstituted cycloalkyl group, a substituted or unsubstituted aryl group, or a substituted or unsubstituted heterocyclic group; and $R_{11}$ and $R_{12}$, $R_{12}$ and $R_{13}$, $R_{14}$ and $R_{15}$, or $R_{15}$ and $R_{16}$ may combine with each other to form a ring; $R_{12}$ and $R_{15}$ *may be a hydrogen atom.*

2. A method for forming a direct positive image as in claim 1, wherein R represents a nitro group, a halogen atom, —SM'' (M'' represents a hydrogen atom, an alkali metal atom, an ammonium group or a group cleaving under an alkaline condition), a cyano group, a substituted or unsubstituted alkyl group, a substituted or unsubstituted aryl group, a substituted or unsubstituted alkenyl group, a substituted or unsubstituted aralkyl group, a substituted or unsubstituted alkylsulfonyl group, a substituted or unsubstituted arylsulfonyl group, a substituted or unsubstituted carbamoyl group, a substituted or unsubstituted sulfamoyl group, a substituted or unsubstituted alkylcarbonamido group, a substituted or unsubstituted arylcarbonamido group, a substituted or unsubstituted alkylsulfonamido group, a substituted or unsubstituted arylsulfonamido group, a substituted or unsubstituted aliphatic or aromatic acyloxy group, a substituted or unsubstituted alkylsulfonyloxy group, a substituted or unsubstituted arylsulfonyloxy group, a substituted or unsubstituted ureido group, a substituted or unsubstituted thioureido group, a substituted or unsubstituted aliphatic or aromatic acyl group, a substituted or unsubstituted alkoxycarbonyl group, a substituted or unsubstituted aryloxycarbonyl group, a substituted or unsubstituted alkoxycarbonylamino group, a substituted or unsubstituted aryloxycarbonylamino group, a substituted or unsubstituted alkoxy group, a substituted or unsubstituted aryloxy group, a substituted or unsubstituted alkylthio group, a substituted or unsubstituted arylthio group, a substituted or unsubstituted amino group, $-COOM_1$ or $-SO_3M_1$ (wherein $M_1$ represents H, an alkali metal atom or an ammonium group), and a hydroxy group.

3. A method for forming a direct positive image as in claim 1, wherein the substituent for the substituted groups represented by $R_1$ to $R_9$ and $R_{11}$ to $R_{17}$ is at least one group selected from the group consisting of an alkyl group, an aryl group, an unsubstituted amino group, a substituted amino group with at least one of an alkyl group and an aryl group, an adduct of an amino group with an acid, an alkyl thio group, a cyano group, an alkoxy group, an alkylsulfonamido, a halogen atom, a nitrogen-containing heterocyclic group, an alkyl sulfonyl, a carboxyl group, and an alkoxycarbonyl group, said groups may be further substituted with these groups.

4. A method for forming a direct positive image as in claim 1, wherein the compound is represented by formula (II-A);

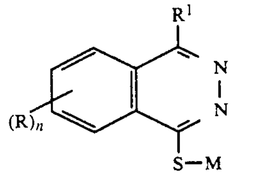
(II-A)

wherein M represents a hydrogen atom, an alkali metal atom, an ammonium group, or a group cleaving under an alkaline condition; R represents a group capable of substituting the hydrogen atom; n represents zero or an integer of from 1 to 4.

5. A method for forming a direct positive image as in claim 1, wherein said compound is a salt of an acid.

6. A method for forming a direct positive image as in claim 1, wherein said compound is a salt of an acid selected from the group consisting of acetic acid, nitric acid, salycilic acid, chloric acid, iodic acid and bromic acid.

7. A method for forming a direct positive image as in claim 1, wherein said compound is incorporated into the photographic light-sensitive material.

8. A method for forming a direct positive image as in claim 7, wherein said compound is incorporated into a photographic light-sensitive layer.

9. A method for forming a direct positive image as in claim 7, wherein said compound is incorporated into the photographic emulsion layer containing unprefogged internal latent image-type silver halide grains.

10. A method for forming a direct positive image as in claim 7, wherein said compound is incorporated into a photographic light-sensitive layer in an amount of from $1\times10^{-6}$ to $1\times10^{-2}$ mol per mol of silver halide 11. A method for forming a direct positive image as in claim 7, wherein said compound is incorporated into a hydrophilic colloid layer other than silver halide emulsion layer.

12. A method for forming a direct positive image as in claim 11, wherein said compound is incorporated into the hydrophilic layer in an amount of from $5\times10^{-6}$ to $5\times10^{-2}$ g/m$^2$.

13. A method for forming a direct positive image as in claim 1, wherein said compound is incorporated into at least one processing solution selected from the group consisting of a developing solution and a prebath thereof.

14. A method for forming a direct positive image as in claim 13, wherein said compound is incorporated into the processing solution in an amount of from $1\times10^{-8}$ to $1\times10^{-3}$ mol/l.

15. A method for forming a direct positive image as in claim 1, wherein fogging is performed by at least one method of an optical fogging method and a chemical fogging method.

16. A method for forming a direct positive image as in claim 1, wherein fogging is performed by using a nucleating agent.

17. A photographic light-sensitive material, which comprises a support having i) at least one photographic emulsion layer containing unprefogged internal latent image-type silver halide grains and ii) as a nucleation accelerator at least one compound selected from the group consisting of compounds represented by formulae (I), (II), (III), (IV), (V), and (VI), acid salts of the compounds represented by formulae (I) to (IV) provided that the substituents thereof contain an amino group, and acid salts of the compounds represented by formula (VI);

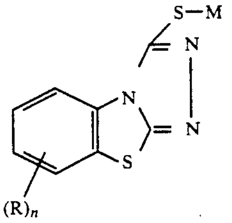
(I)

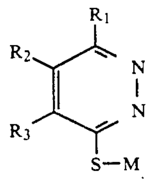
(II)

-continued (III)

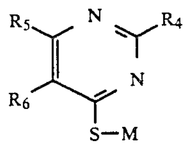

(IV)

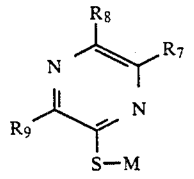

(VI)

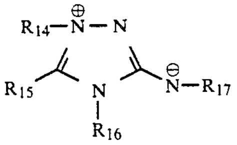

wherein M represents a hydrogen atom, an alkali metal atom, an ammonium group, or a group cleaving under an alkaline condition; R represents a group capable of substituting a hydrogen atom; n represents zero or an integer of from 1 to 4; and $R_1$, $R_2$, $R_3$, $R_4$, $R_5$, $R_6$, $R_7$, $R_8$, and $R_9$ each represents a hydrogen atom, —SM' (M' has the same meaning as M), a substituted or unsubstituted alkyl group, a substituted or unsubstituted aryl group, a substituted or unsubstituted alkenyl group, a substituted or unsubstituted aralkyl group, a substituted or unsubstituted alkylthio group, alkylsulfonyl group, a substituted or unsubstituted carbonamido group, a substituted sulfanamido group, a substituted or unsubstituted ureido group, a substituted or unsubstituted thioureido group, a substituted or unsubstituted alkyl or aryl oxycarbonylamino group, or a substituted or unsubstituted amino group; the heterocyclic ring of aforesaid formulae (II, (III) or (IV) may be further condensed with a carbon aromatic ring; $R_{14}$, $R_{15}$, $R_{16}$, and $R_{17}$ each represents a substituted or unsubstituted alkenyl group, a substituted or unsubstituted cycloalkyl group, substituted or unsubstituted aryl group, or a substituted or unsubstituted heterocyclic group; and $R_{14}$ and $R_{15}$, or $R_{15}$ and $R_{16}$ may combine with each other to form a ring; $R_{15}$ may be a hydrogen atom.

* * * * *